US009634850B2

(12) United States Patent
Taft et al.

(10) Patent No.: US 9,634,850 B2
(45) Date of Patent: Apr. 25, 2017

(54) SYSTEM AND METHOD FOR PROVIDING SMART GRID COMMUNICATIONS AND MANAGEMENT

(71) Applicant: CISCO TECHNOLOGY, INC., San Jose, CA (US)

(72) Inventors: Jeffrey D. Taft, Washington, PA (US); Navindra Yadav, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/837,845

(22) Filed: Aug. 27, 2015

(65) Prior Publication Data

US 2015/0365245 A1 Dec. 17, 2015

Related U.S. Application Data

(63) Continuation of application No. 14/168,487, filed on Jan. 30, 2014, now Pat. No. 9,160,552, which is a
(Continued)

(51) Int. Cl.
*H04L 12/18* (2006.01)
*H04L 12/933* (2013.01)
*H04L 12/931* (2013.01)
*H04L 29/08* (2006.01)
*H04L 29/06* (2006.01)
H04L 12/761 (2013.01)

(52) U.S. Cl.
CPC ........ *H04L 12/1863* (2013.01); *H04L 12/185* (2013.01); *H04L 12/1836* (2013.01); *H04L 49/15* (2013.01); *H04L 49/35* (2013.01); *H04L 67/125* (2013.01); *H04L 69/22* (2013.01); *H04L 45/16* (2013.01)

(58) Field of Classification Search
None
See application file for complete search history.

(56) References Cited

U.S. PATENT DOCUMENTS 8,675,654 B2 3/2014 Taft et al.
9,112,710 B2 8/2015 Taft et al.
(Continued)

OTHER PUBLICATIONS

"Report to NIST on the Smart Grid Interoperability Standards Roadmap (Contract No. SB1341-09-CN-0031-Deliverable 7)," Prepared by the Electric Power Research Institute (EPRI), Jun. 17, 2009; 291 pages; http://www.nist.gov/smartgrid/.

*Primary Examiner* — Brandon Renner
(74) *Attorney, Agent, or Firm* — Patent Capital Group

(57) ABSTRACT

A method is provided in one example embodiment and includes receiving a request for a service that involves phasor measurement unit (PMU) data; identifying a service device in a network to perform the service; and multicasting one or more results of the service to a group of subscribers identified by a multicast group address. In more particular embodiments, particular PMU data is redirected to the service device via a service insertion architecture (SIA) protocol. In addition, the service can include replicating packets and masking a subset of traffic for forwarding to a first hop router of the network. In certain example instances, metadata is used in order to apply the service to certain traffic propagating in the network.

17 Claims, 15 Drawing Sheets

Related U.S. Application Data continuation of application No. 13/251,728, filed on Oct. 3, 2011, now Pat. No. 8,675,654.

(60) Provisional application No. 61/390,099, filed on Oct. 5, 2010.

(56) References Cited

U.S. PATENT DOCUMENTS

| | | |
|---|---|---|
| 9,160,552 B2 | 10/2015 | Taft et al. |
| 2002/0038279 A1 | 3/2002 | Samuelson et al. |
| 2003/0189936 A1 | 10/2003 | Terrell et al. |
| 2004/0022244 A1 | 2/2004 | Boers et al. |
| 2006/0109859 A1 | 5/2006 | Acharya et al. |
| 2007/0211722 A1 | 9/2007 | Subramanian |
| 2007/0253409 A1 | 11/2007 | Fu et al. |
| 2007/0300094 A1 | 12/2007 | Frazier et al. |
| 2008/0151911 A1 | 6/2008 | Chen |
| 2008/0177896 A1 | 7/2008 | Quinn et al. |
| 2008/0198849 A1 | 8/2008 | Guichard et al. |
| 2009/0037713 A1 | 2/2009 | Khalid et al. |
| 2010/0100250 A1 | 4/2010 | Budhraja et al. |
| 2010/0292857 A1 | 11/2010 | Bose et al. |
| 2011/0194539 A1* | 8/2011 | Blasinski .......... H04W 72/1252 370/336 |
| 2011/0196547 A1 | 8/2011 | Park et al. |
| 2012/0033473 A1 | 2/2012 | Scharf |
| 2012/0082048 A1 | 4/2012 | Taft et al. |
| 2012/0082159 A1 | 4/2012 | Taft et al. |
| 2013/0124001 A1 | 5/2013 | Bhageria et al. |

* cited by examiner

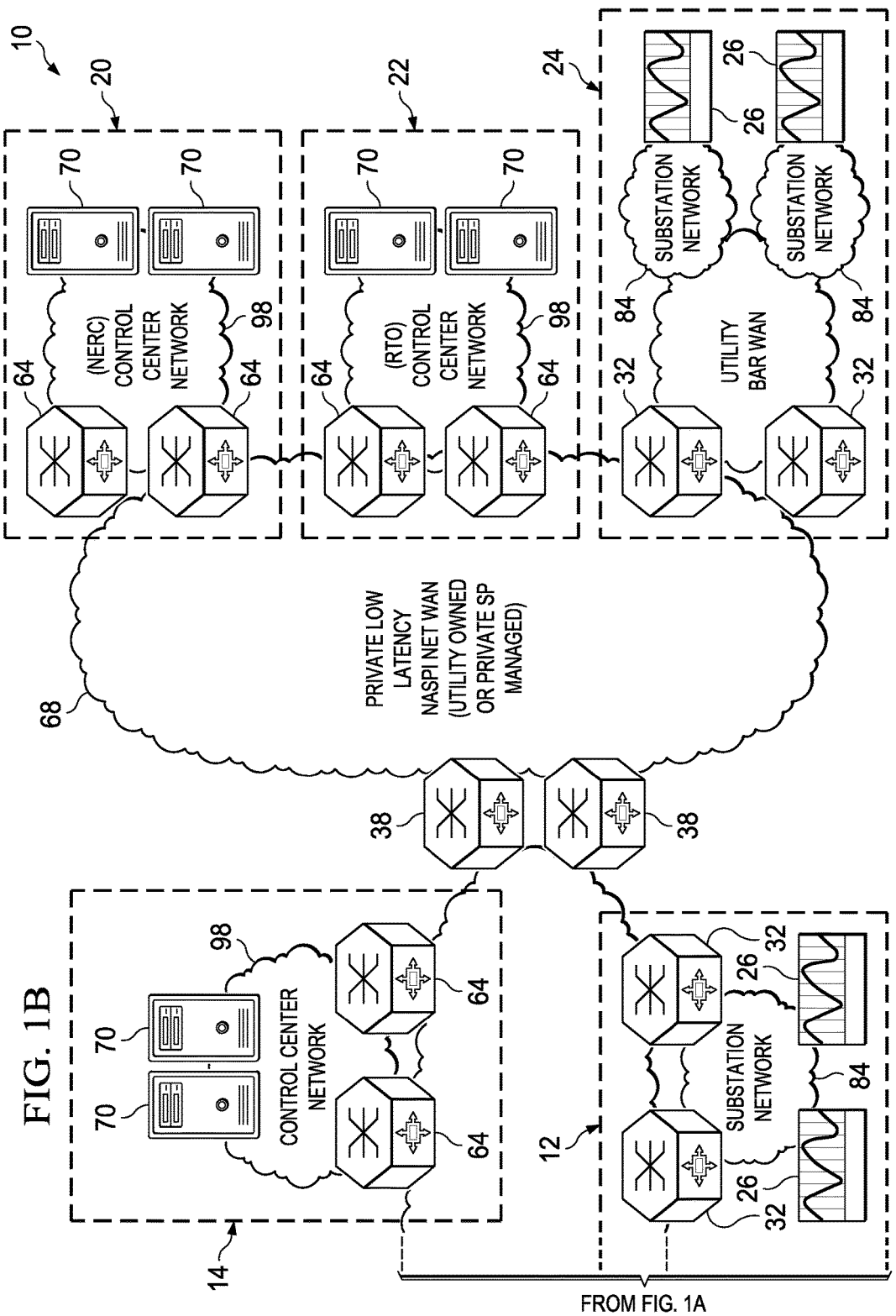

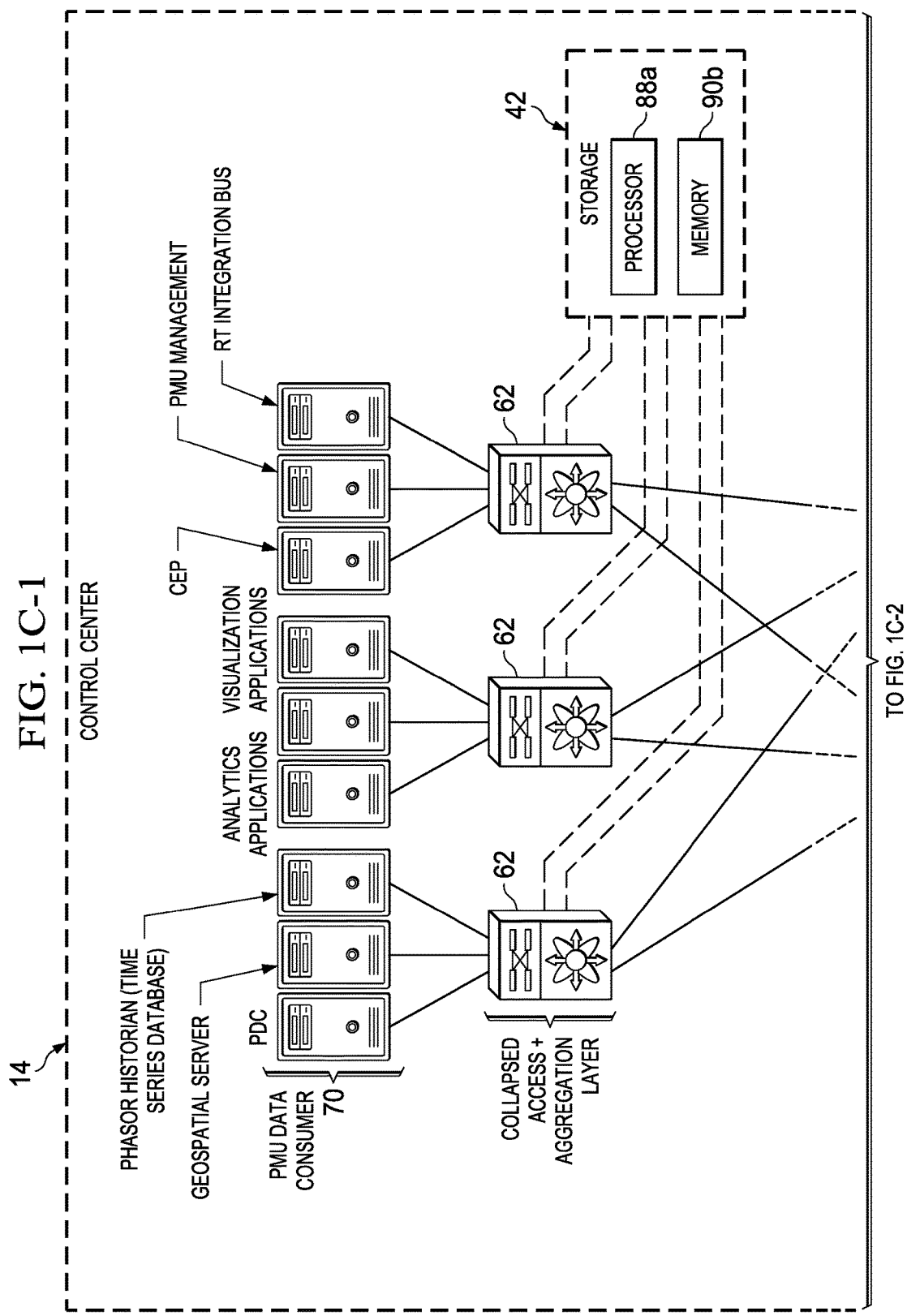

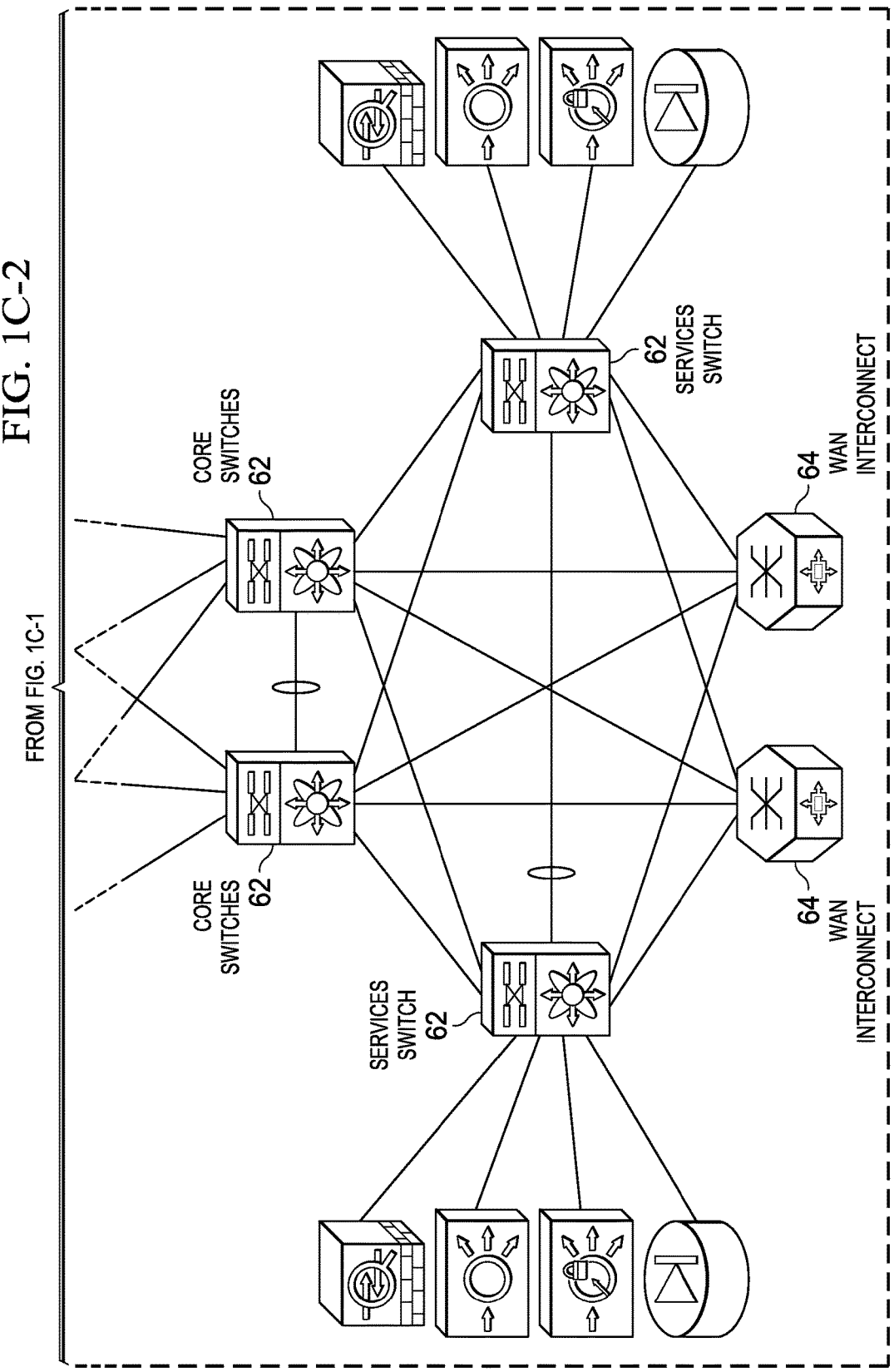

SYSTEM AND METHOD FOR PROVIDING SMART GRID COMMUNICATIONS AND MANAGEMENT

CROSS-REFERENCE TO RELATED APPLICATION

This Application is a continuation (and claims the benefit of priority under 35 U.S.C. §120) of U.S. application Ser. No. 14/168,487, filed Jan. 30, 2014, entitled "SYSTEM AND METHOD FOR PROVIDING SMART GRID COMMUNICATIONS AND MANAGEMENT," Inventors Jeffrey D. Taft, et al., which is a continuation (and claims the benefit of priority under 35 U.S.C. §120) of U.S. application Ser. No. 13/251,728, filed Oct. 3, 2011, entitled "SYSTEM AND METHOD FOR PROVIDING SMART GRID COMMUNICATIONS AND MANAGEMENT," Inventors Jeffrey D. Taft, et al., which claims the benefit of priority under 35 U.S.C. §119(e) to U.S. Provisional Application Ser. No. 61/390,099, entitled "SYSTEM AND METHOD FOR PROVIDING SMART GRID COMMUNICATIONS AND MANAGEMENT," filed Oct. 5, 2010. The disclosures of the prior applications are considered part of (and are incorporated by reference in) the disclosure of this application.

TECHNICAL FIELD

This disclosure relates in general to the field of energy and, more particularly, to providing smart grid communications and management.

BACKGROUND

Smart grid architectures have grown in complexity in recent years. A smart grid can deliver electricity from suppliers to consumers using digital technology. The architecture can control appliances for business and residential environments in order to conserve energy, reduce energy costs, and increase the reliability of energy delivery. In some cases, a smart grid can overlay an electrical grid, which has a metering system. Part of the smart grid is associated with applying, sensing, and/or measuring energy levels with two-way communications. Certain aspects of the smart grid can communicate information about grid conditions to system users and operators, which makes it possible to dynamically respond to changes in grid conditions. Effectively managing energy within network topologies presents a significant challenge to smart grid operators, system designers, device manufacturers, government agencies, and service providers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 1B is a simplified partial block diagram illustrating possible example details associated with one embodiment of the present disclosure;

FIG. 1C-1 is a simplified partial block diagram illustrating possible example details associated with one embodiment of the present disclosure;

FIG. 1C-2 is a simplified partial block diagram illustrating possible example details associated with one embodiment of the present disclosure;

FIG. 2C-1 is a simplified partial block diagram illustrating possible example details associated with one embodiment of the present disclosure;

FIG. 2C-2 is a simplified partial block diagram illustrating possible example details associated with one embodiment of the present disclosure;

DETAILED DESCRIPTION OF EXAMPLE EMBODIMENTS

Overview

Multicast Transmission

A method is provided in one example embodiment and includes receiving phasor measurement unit (PMU) data in a first transmission; converting the first transmission into a multicast transmission; and multicasting the PMU data to a multicast group address, which identifies a plurality of subscribers. In more specific implementations, the converting of the first transmission into the multicast transmission occurs at a first-hop router in relation to a PMU source that sent the first transmission. In some cases, the first transmission is a unicast transmission sent from a network element, which includes a PMU sensor.

In yet other embodiments, the method may include adding a first subscriber to the multicast group address; and creating a new multicast tree based on the first subscriber. The method may also include multicasting second PMU data over a second network to a second subscriber of a second multicast group address. An access control list (ACL) can be used to determine whether to forward packets associated with the PMU data, where the ACL is used for packet filtering in order to permit or deny traffic forwarding to the multicast group address. The method may also include receiving second PMU data in a second transmission; combining the first transmission and the second transmission into a second multicast transmission; and multicasting the second multicast transmission to the multicast group address.

Virtualization of Services

A method is provided in one example embodiment and includes receiving a request for a service that involves phasor measurement unit (PMU) data; identifying a service device in a network to perform the service; and multicasting one or more results of the service to a group of subscribers identified by a multicast group address. In more particular embodiments, particular PMU data is redirected to the service device via a service insertion architecture (SIA) protocol. In addition, the service can include replicating packets and masking a subset of traffic for forwarding to a first hop router of the network. In certain example instances, metadata is used in order to apply the service to certain traffic propagating in the network. The service device can be located outside of the network that contains a network element that generated the PMU data. In addition, the service device can be provisioned at a last-hop router in relation to at least one member of the group of subscribers identified by the multicast group address. In certain instances, the service is a phasor data concentration service.

Example Embodiments

Figure 1A:
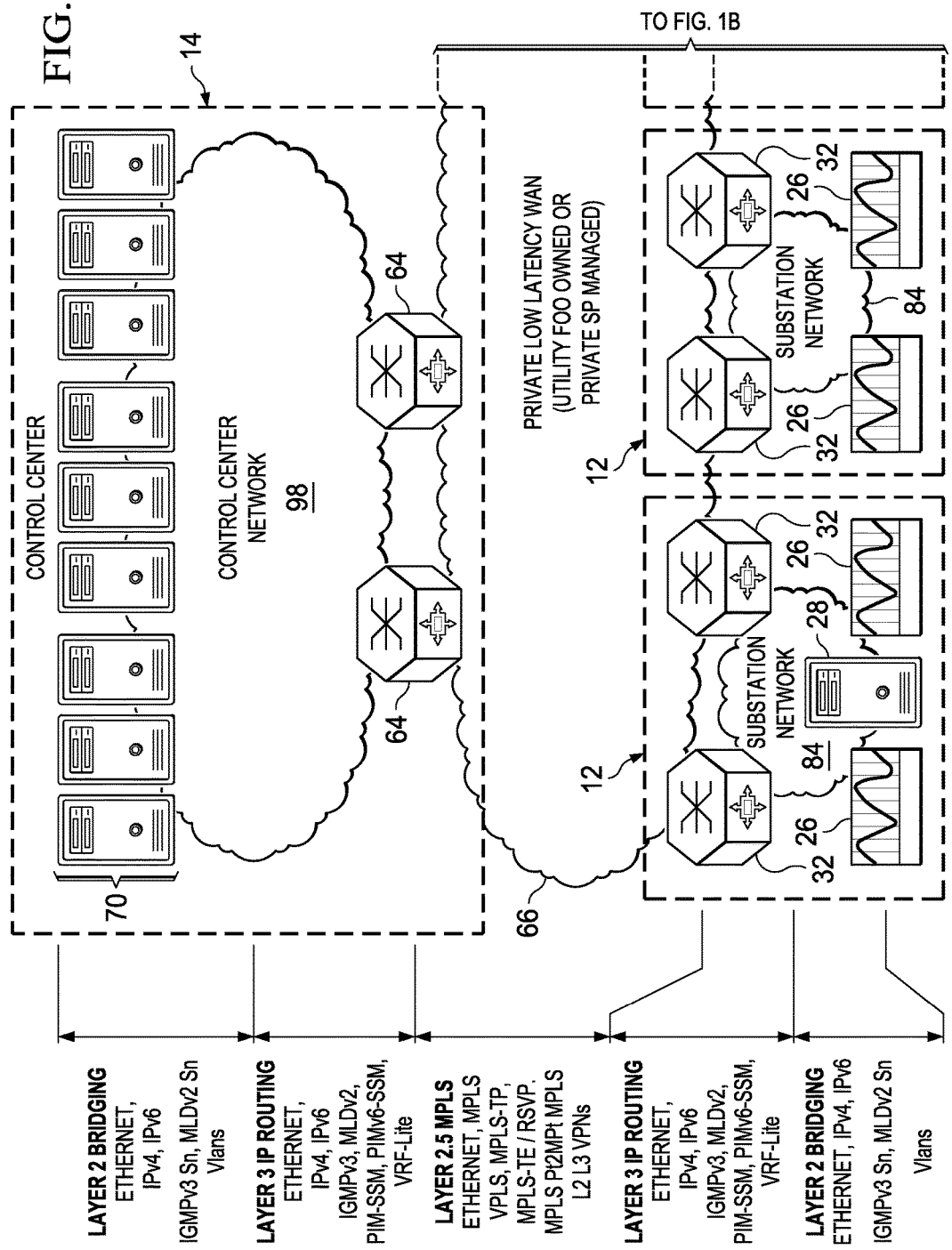
FIG. 1A is a simplified partial block diagram illustrating a grid system in accordance with one embodiment of the present disclosure.

Turning to FIG. 1A, FIG. 1A is a simplified block diagram illustrating a portion of grid system 10 in accordance with one embodiment of the present disclosure. Grid system 10 may not necessarily be a single entity, but reflective of an aggregate of multiple networks and multiple power generation companies cooperating in order to deliver energy to their subscribers. In general terms, grid system 10 can offer a general-purpose approach to managing PMU data in the network. In more specific implementations, grid system 10 is configured to convert a point-to-point arrangement to a network-based publish-and-subscribe paradigm in order to increase network performance. In one particular example implementation, this conversion can be executed via a multicast protocol, which can effectively manage data flows from a certain number of PMUs (e.g., 'M' PMUs) to a corresponding number of endpoints (e.g., 'N' endpoints). In addition, grid system 10 can be configured to virtualize services in the network such that PDC stacking is avoided. PDC stacking refers to the notion of multiple PDC devices systematically receiving redundant data streams, which unnecessarily creates overhead and which degrades network performance.

In operation, packet propagation within grid system 10 can involve multiple destinations and, similarly, be sourced through multiple origins. In a general sense, an arbitrary mix/match of network sources and network destinations can be achieved within the framework of grid system 10. Furthermore, it should be noted that such activities can occur without placing an additional burden on the PMUs to participate in the data flow management operations. Moreover, these activities can occur without requiring external servers to be involved because the network infrastructure (e.g., a first-hop router) is incurring the requisite processing work. This can be significant because PMUs commonly lack processing capabilities. Moreover, most legacy PMUs are unable to be suitably upgraded or enhanced to offer higher-level processing capabilities. In essence, grid system 10 can offload intensive processing to network devices capable of handling such processing responsibilities. From the perspective of the PMU, it can continue to operate as if it is functioning in a more simplistic point-to-point architecture, even though multicasting is being performed in grid system 10. Stated in different terms, the PMU is unaware of the processing that occurs at the first hop-router in certain implementations described herein. Hence, legacy PMU infrastructure does not have to be overhauled in order to achieve the teachings of the present disclosure. Instead, a more capable first-hop router can be configured to perform important multicasting activities, which allow for a preservation of an existing PMU architecture.

From an operator perspective, one or more administrators of grid system 10 can manage varying levels of communication and coordination for the architecture. In an embodiment, grid system 10 is a smart grid, which can be viewed as a type of electrical grid that can be configured to predict (and intelligently respond to) the behavior and actions of electric power users and providers connected to the grid. This would allow grid system 10 to efficiently deliver reliable, economic, and sustainable electricity services. Grid system 10 may include substations 12, a control center 14, and a first network 66, which can be a private low-latency wide area (WAN) in particular implementations of the present disclosure.

Each of substations 12 can include a respective PMU 26, a phasor data concentrator (PDC) 28, a substation network 84, and a first-hop router (FHR) 32. A PMU can be representative of any type of network element that can measure the electrical waves on an electricity grid (e.g., using a common time source for synchronization). The time synchronization aspect allows synchronized real-time measurements of multiple remote measurement points on grid system 10. In certain contexts, these PMUs can include synchrophasors that represent measuring devices for various power systems. A PMU can be a dedicated device, a sensor, a software module, a proprietary device, a protective relay, or any other suitable combination of hardware, software, or components to be used in conjunction measuring any form of energy within grid system 10. Along similar lines, the term 'PMU data' is meant to encompass any type of information generated by such PMU devices.

Substations 12 are configured to transform voltage from high to low, low to high, and/or measure the operating status and overall health of grid system 10. Substations 12 are also configured to communicate with control center 14 across first network 66. Control center 14 may include a last-hop router (LHR) 64, a control center network 98, and a PMU data consumers 70 segment in particular configurations of grid system 10.

Turning to FIG. 1B, FIG. 1B is a simplified block diagram illustrating a portion of grid system 10. Grid system 10 may further include a second network 68 (e.g., a North American Synchrophasor Initiative (NASPI) WAN), a second control center 20 (e.g., a North American Electric Reliability Corporation (NERC) control center), a third control center 22 (e.g., a Regional Transmission Organizations (RTO) control center), and a utility bar substation 24. Second network 68 can be in communication with first network 66 (e.g., through a set of routers 38). First network 66 and second network 68 are configured to allow for the deployment and use of networked phasor measurement devices (e.g., PMUs 26), PMU data-sharing, applications development and use, research and analysis for real-time operations, power system planning, and forensic analysis of grid disturbances.

Second control center 20 may include LHRs 64, control center network 98 (e.g., a NERC control center network), and PMU data consumers 70. Second control center 20 may be used by the NERC to establish and enforce reliability standards including developing standards for power system operation, monitoring and enforcing compliance with those standards, and assessing resource adequacy. The NERC may also use second control center 20 to investigate and analyze the causes of significant power system disturbances in order to help prevent future events that inhibit the ability of grid system 10 to effectively deliver power to its constituents.

Third control center 22 may include LHRs 64, control center network 98 (e.g., a RTO control center network), and PMU data consumers 70. Third control center 22 may be configured to allow an RTO to move electricity over large interstate areas and coordinate, control, and monitor an electricity transmission grid, which is larger and which has much higher voltages than a typical power company's distribution grid. Utility bar substation 24 may include FHRs 32, substation networks 84, and PMUs 26. PMUs 26 and substation networks 84 may be in communication with FHRs through a utility bar WAN. Utility bar substation 24 may be a substation of an electrical provider other than the electrical provider of substation 12.

Figure 2A:
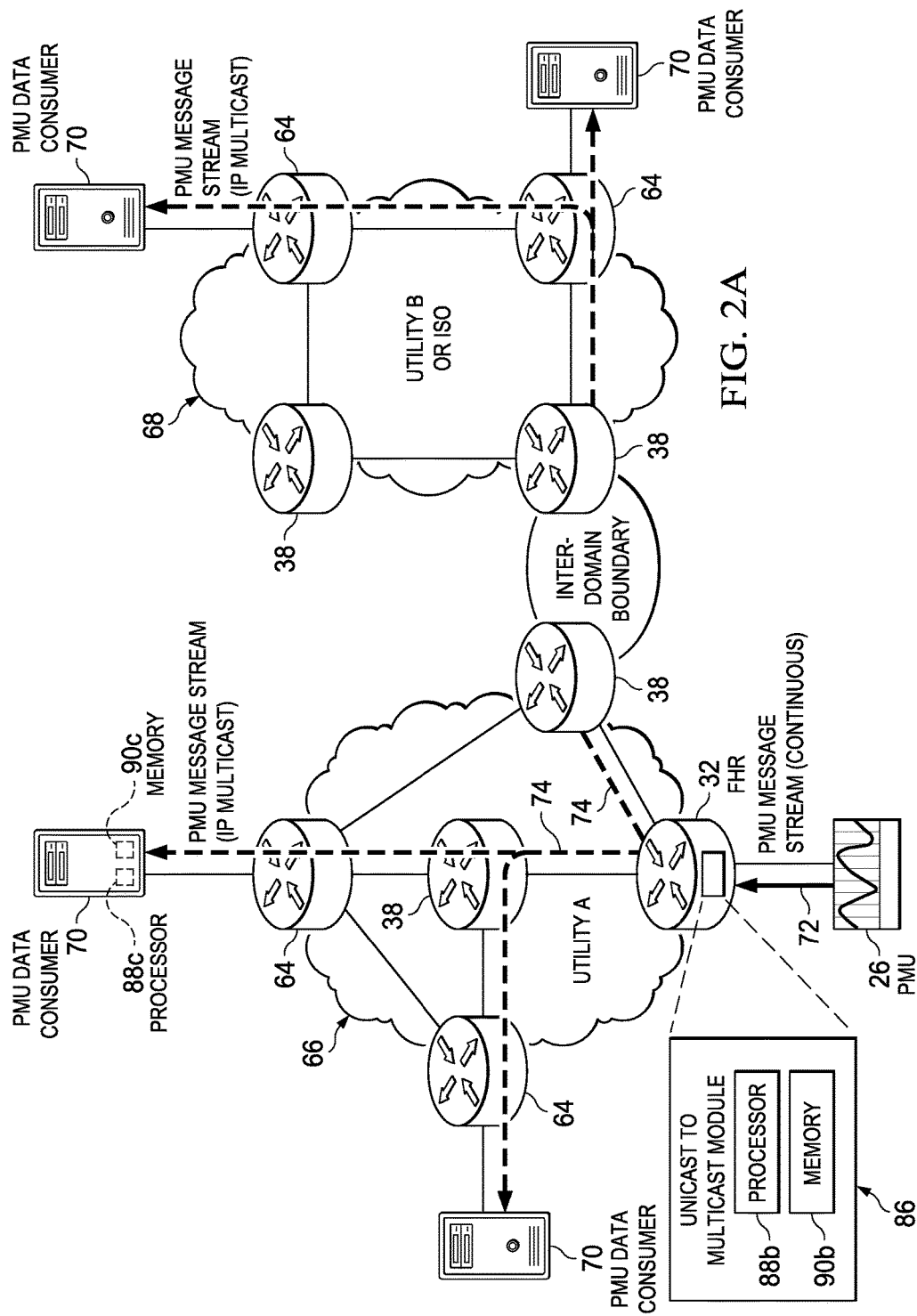
FIG. 2A is a simplified block diagram illustrating possible example details associated with one embodiment of the present disclosure.
Figure 2B:
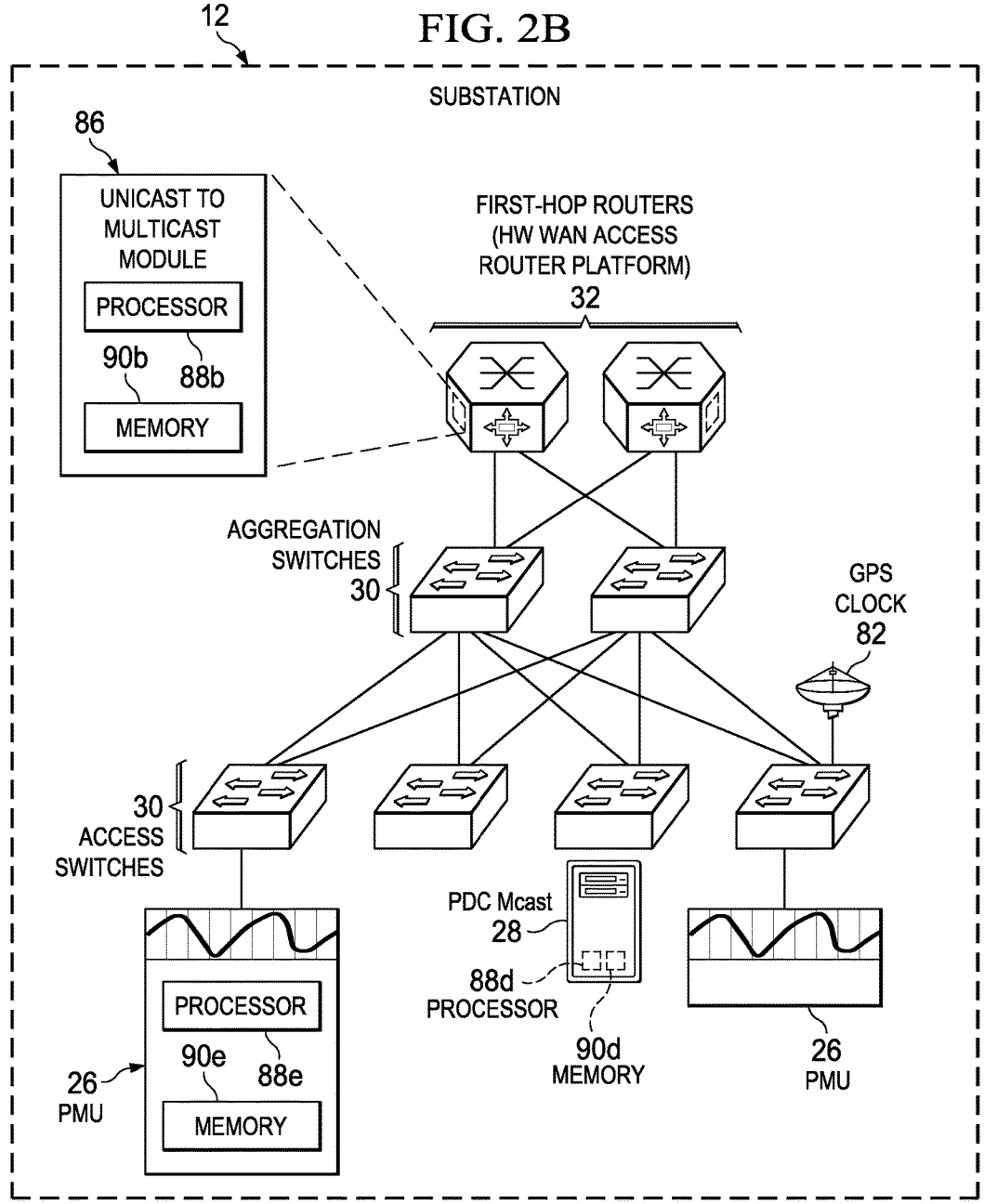
FIG. 2B is a simplified block diagram illustrating possible example details associated with one embodiment of the present disclosure.
Figures 1, 2C:
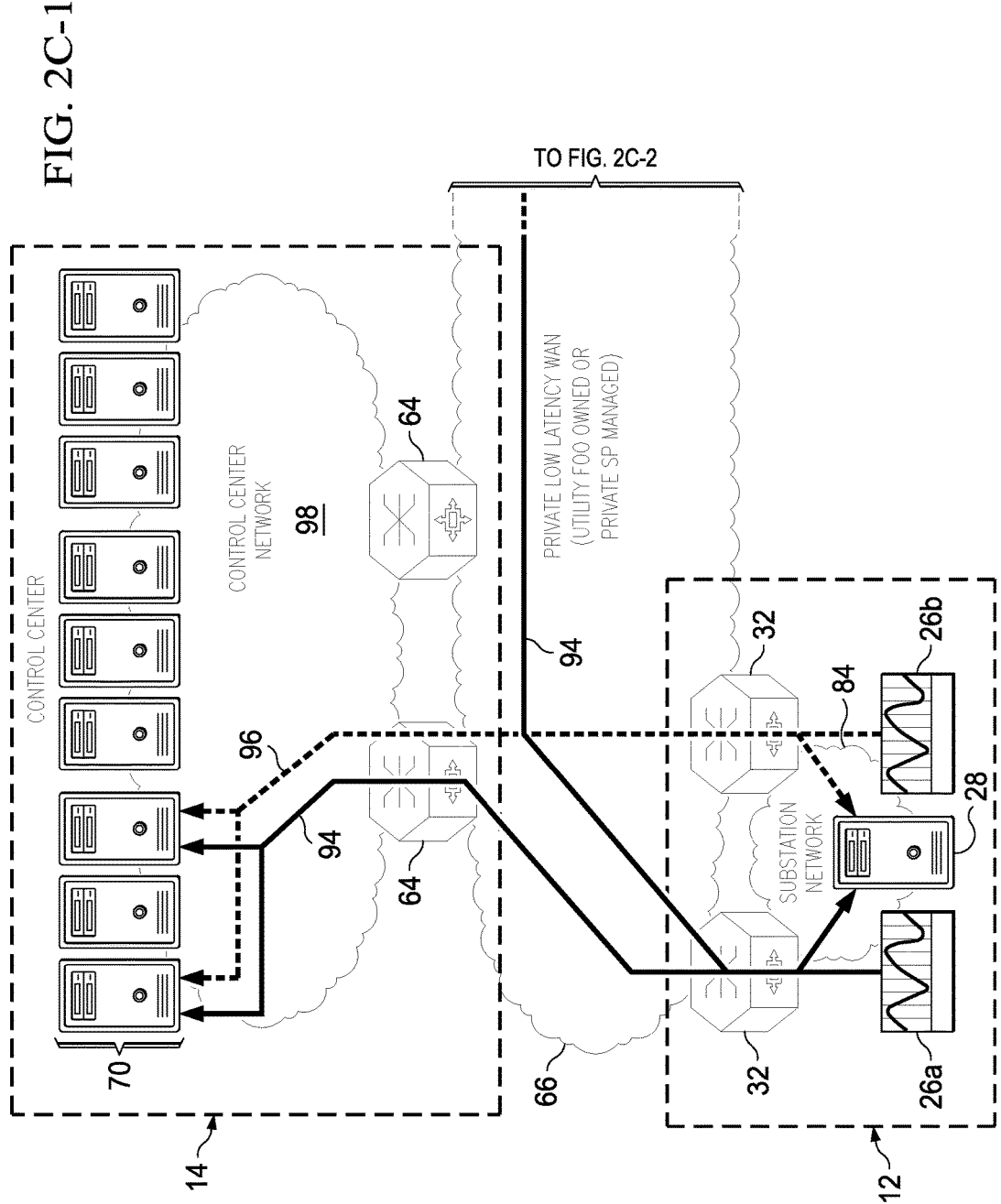
Figures 2, 2C:
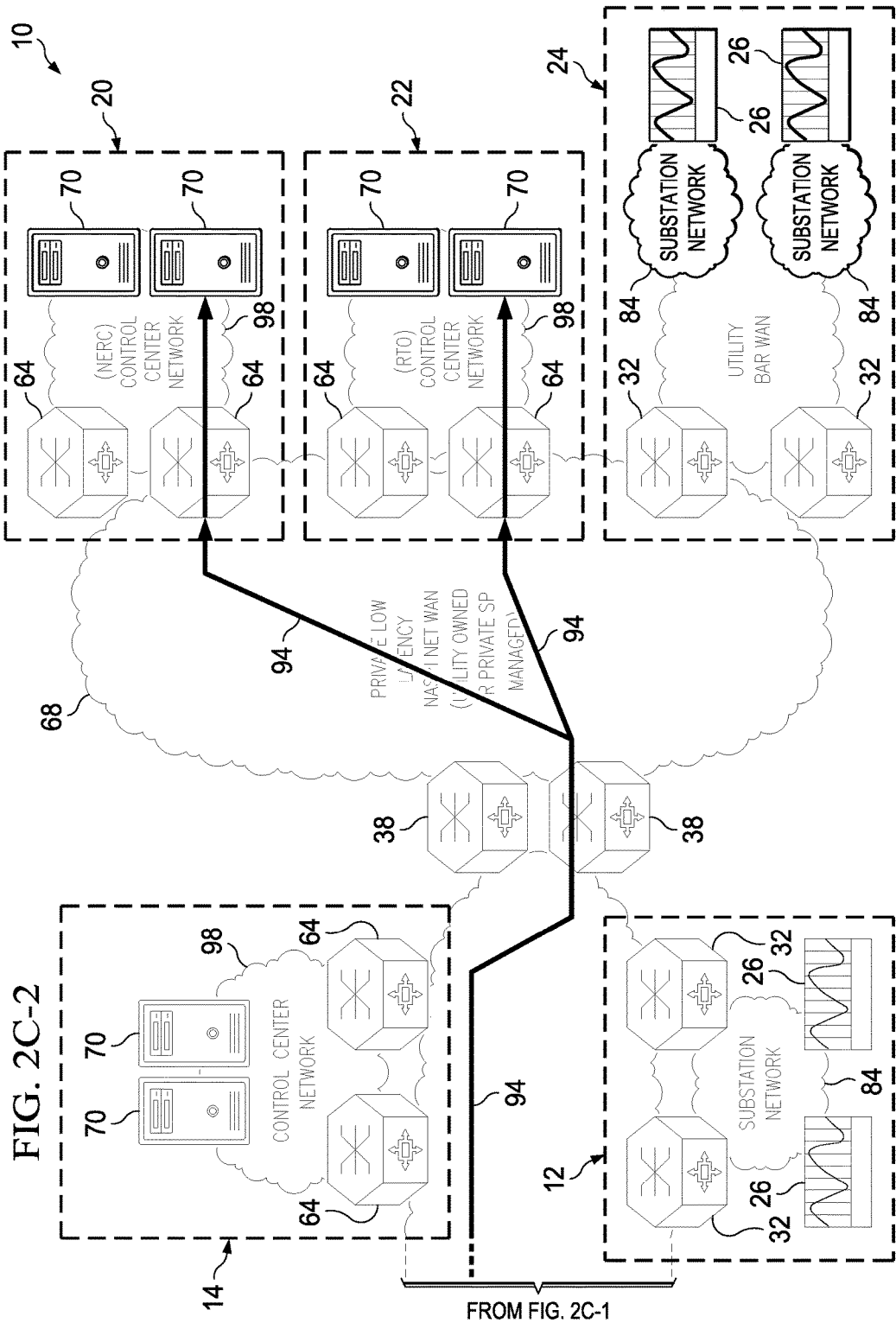

Turning to FIG. 1C-1, FIG. 1C-1 is a simplified block diagram illustrating a portion of control center 14 within grid system 10. Control center 14 may include PMU data consumers 70, network switches 62, and a storage 42. Storage 42 may include a processor 88a and a memory 90b. Storage 42 may be used by one or more PMU data consumers 70 to store PMU data and the results of services performed on the PMU data. PMU data consumers 70 may perform a variety of services on PMU data including geospatial analysis, phasor analysis and historian (time series database), analytics applications, visualization applications, complex event processing (CEP), management of PMUs 26, request tracker (RT) integration, etc. FIG. 1C-2 is a simplified block diagram illustrating a portion of control center 14 in grid system 10. Control center 14 may include network switches 62 and LHR 64. Network switches 62 may include core switches and service switches. Service switches are configured to route data to an aggregation layer configured to act as a services layer, and to perform services such as loadbalancing, secure socket layer (SSL) optimization, firewalling, etc.

In one particular instance, grid system 10, first network 66, second network 68, substation network 84, and control center network 98 can be applicable to communication environments such as an enterprise wide area network (WAN) deployment, cable scenarios, broadband generally, fixed wireless instances, fiber to the x (FTTx), which is a generic term for any broadband network architecture that uses optical fiber in last-mile architectures. Grid system 10, first network 66, second network 68, substation network 84, and control center network 98 may include a configuration capable of transmission control protocol/internet protocol (TCP/IP) communications for the transmission and/or reception of packets in a network. In addition, grid system 10, first network 66, second network 68, substation network 84, and control center network 98 may also operate in conjunction with a user datagram protocol/IP (UDP/IP) or any other suitable protocol, where appropriate and based on particular needs.

In operation, grid system 10 is configured to provide an improved electrical grid architecture offering an enhanced PMU design and implementation, along with improved PMU applications. In regards to the first area, the implementation of PMUs within grid system 10 can address the issues of standards, communication, data management, testing, calibration, and PMU placement. Note that certain synchrophasor guidelines for the power system can define a synchrophasor measurement, as well as providing a method of quantifying the measurements, quality test specifications, and data transmission formatting for real-time data reporting. Separately, in response of the high scan rate intrinsic to PMUs, grid system 10 offers an architecture to meet the requirement for wide area monitoring, protection, and control scheme. Moreover, new data and information management architecture and technology are also provided by grid system 10 to enable and to enhance the applications of PMUs in wide area protection and control. PMUs are involved in extensive applications such that grid system 10 can offer a provisioning strategy for PMUs to reduce the economic burden for the utilities and, further, maximize the performance using a limited number of PMUs.

A second aspect of grid system 10 involves several PMU applications for power system protection and control. As detailed below, grid system 10 offers features including improvements on state estimation, oscillation detection and control, voltage stability monitoring and control, load modeling validation, system restoration, and event analysis. These activities are detailed below with reference to corresponding FIGURES.

In operation, grid system 10 can properly account for safeguards such as power system protection and control. The installation of synchronized PMUs in grid system 10 can improve both of these safeguards. Synchronized phasor measurements (i.e., PMU data) can be used to monitor and control the dynamic performance of a power system: particularly during high-stress operating conditions. A wide area measurement system (WAMS) that gathers real-time phasor measurements by PMUs (across a broad geographical area) has been gradually implemented in the grid architecture.

In practice, state estimation can play a significant role in the real-time monitoring and control of power systems for grid system 10. For example, state estimation can process redundant measurements and, further, provide a steady-state operating environment for advanced energy management system (EMS) application programs (e.g., security analysis, economic dispatch, etc.). After receiving field measurement data, network parameter, network topology, and other information, the state estimation can filter incorrect data to ensure that the estimated state is correct. Through state estimation, a system operator has the ability to observe the operating conditions of grid system 10. Furthermore, the consistent data provided by the state estimation provides a starting point for studying the effects due to the loss of transmission lines, or of generation units.

Typical state estimation generally uses measured voltage, current, real power, and reactive power to determine the operating condition of the electric network. Certain limitations persist in the traditional state estimation, and many of these limitations stem from the fact that it is technically more difficult and computationally more expensive to estimate the most likely state of the system based on measured voltage, current, real power, and reactive power. Further, traditional state estimation is typically solved at intervals of minutes, which means that the results provided by state estimation may be stale.

In certain implementations of grid system 10, PMUs 26 can be configured to provide globally time-synchronized phasor measurements with a certain accuracy (e.g., one microsecond for bus voltages and line currents). Additionally, PMUs 26 may improve state estimation by minimizing deficient data processing, improving state estimation accuracy, allowing for dynamic state estimation, and facilitating an acceptable research requirement in state estimation.

Note that because of the competition between utilities and the deregulation of the electric power markets, it is common to transfer large amount of electrical power from distant generators to load through long transmission lines. The voluminous amount of electric power transmitted through the existing networks might result in transmission bottlenecks and oscillations of power transmission systems. The system oscillation originates from the interconnected generators in the system. The interconnected synchronized generators typically have the ability to remain synchronized because of the self-regulating properties of their interconnections. However, if one generator deviates from the synchronous speed, the rest of the generators in the system will provide power in order to reduce the speed deviation. Due to the effect of inertia on the generators, the whole system (or part of the system) becomes imbalanced (i.e., starts to swing). Normally, if the initial disturbance is not significant (such as a small change in load), the oscillations will decay and the system will maintain stability. If the initial disturbance is significant (such as a few mega-watts (MWs) load lost), the oscillations may cause the system to loose synchronism, where the system becomes vulnerable to a potential collapse.

In order to keep the system stable, system oscillation can be controlled either by operators or by automatic control through adjusting the output of generators. However, if a new system operating condition occurs that causes the oscillatory to lightly dampen, the operators may overlook this new condition and, thus, jeopardize system operations. Advanced monitoring of the power system can help the system operators to assess power system states accurately, control the system appropriately, and avoid a total blackout. The synchronized PMUs 26, which can provide the measurements with both magnitudes and angles, and which are time synchronized with an accuracy of one microsecond, offer an opportunity for power system oscillation detection and control. Fed with the voltage and current phasors (i.e., PMU data), a PMU-based power oscillation monitoring function manages the input phasors and, further, detects different power swing (oscillation) modes. The PMU-based power oscillation monitoring function has the ability to quickly identify the amplitude, frequency and the damping of swing rate, which may engender angular instability.

It is worth noting that voltage stability is closely related to the loadability of a transmission network. In power systems, this may occur as a precursor to the traditional frequency instability problem. As power systems are pushed to transfer more and more power, environmental constraints restrict the expansion of the transmission network. When the need for long-distance power transfer is increased, voltage stability problem becomes a significant concern in planning and operating electrical power systems. To assist in the planning and operation of electrical power systems, new measurement devices and high-speed communication systems have become available in transmission system operation. Based on these technologies, measurement-based on-line voltage stability monitoring and control becomes feasible, and this ability can raise the transfer limits and increase the security of system operations. The use of synchronized PMUs 26 improves voltage stability monitoring and control function through voltage instability load shedding (VILS). This includes a focus on local protection control, along with a wide area voltage stability monitoring and control function (having a focus on system wide voltage stability and control).

In operation, grid system 10 is configured to implement PMU technology in order to effectively manage electricity. PMU 26 can provide the synchronized phasor information of voltage and current with an appropriate accuracy. The time of restoring the power system to its normal operating state after a fault can be improved by providing maintenance staff with more exact information about the location and the reason for the fault. Research has indicated that, for PMU-based fault location systems, the accuracy of pinpointing a fault increases from $\pm 2$-$\pm 3\%$ for a system without PMUs 26 to as accurate as $\pm 0.6\%$ in most instances for a system with PMUs 26.

Note that during any major grid disturbance, the restoration and event analysis of grid system 10 represents important issues to be resolved by the system operator. For example, during a disturbance, system operators seek to restore the system as quick as possible in order to limit the impact of the disturbance, and to conduct a complete event analysis to determine the root cause (allowing lessons to be learned if a similar event occurred). However, because of the computational burden and absence of synchronized data, the process of system restoration and event analysis is time consuming and technically difficult to implement. The use of synchronized PMUs 26 can address both system restoration and event analysis for the system operator.

For example, once a disturbance happens in a power system, the protection system should identify it correctly and take appropriate action immediately in order to isolate and minimize the disturbance area. After the area is isolated, the location and source of the disturbance should be identified and repaired to restore the power service as quick as possible. The fault location problem has been studied extensively. For overhead transmission lines, it is time consuming to identify the fault location manually. However, the process can be expedited using the recording data from several pieces of equipment such as protective relay, digital fault recorder, etc., which are located in substations and control centers. One method identified as impedance-based fault location, which has been used in power industry for a long time, uses the fault impedance to calculate the fault location. The fault impedance can be calculated by post-fault voltages and currents. For example, the fault location may be determined using the known transmission line impedance (per-mile).

There are two main approaches in the impedance-based fault location method: single ended and double ended. In the single-ended approach, the data is sampled at one point in the transmission line. Therefore, this approach could be affected by several factors such as line switching, load condition, fault current, and fault resistance. In the double-ended approach, the data is sampled at two ends of the transmission line. The result of this approach could be affected by factors such as ground resistance and communication failure. Both approaches are used in the power industry, and both have the ability to reduce the amount of time required by maintenance crews to find the fault location and reason for the fault. However, each one is time consuming and often inaccurate.

These issues can be addressed by measuring the magnitude and phase angles of currents and voltages, where a single PMU of grid system 10 can provide real-time information about power system events in the area of PMU 26. PMU 26 can operate as a digital recorder with a synchronized capability that can be offered as a stand-alone physical unit, or a functional unit within another protective device. In addition, multiple PMUs 26 can enable coordinated system-wide measurements. PMUs 26 can also timestamp, record, and store the phasor measurements of power system events. Control centers can then perform services on the PMU data and, further, can use the results to determine the health of grid system 10.

PMU data can operate as viable status messengers (e.g., the "ears and eyes") for grid system 10. The information streamed from PMU 26 can be used for post-mortem analysis, or for real-time diagnosis and control of grid system 10. A post-mortem analysis of events does not typically require low and bounded latency of information delivery across a network. However, the applications that require real-time control can benefit if the end-to-end network latency is kept to a minimum and kept under strict bounds (e.g., network latency jitter is kept controlled).

For example, if "R" is the PMU reporting rate, "N" is the network delay or latency in seconds, "J" is the network latency jitter in seconds, and "P" is the phasor data concentrator (PDC) processing delay in seconds, then 1/R>=(N+J+P) could be representative of the constrain. The formula establishes that the phasor measurement-reporting rate is indirectly proportional to the reduction of the delay added by the network and the processing delay added by the PMU data (i.e., phasor data) processing nodes. To improve the visibility in the electrical grid and to view transient phenomenon, the sampling rate of sixty (60) to one hundred and twenty (120) samples/second is considered the lower bound of an acceptable sampling rate. One hundred and twenty (120) samples/second may allow for an end-to-end network and for a processing delay of approximately 8.3 milliseconds.

While sixty (60) samples/second would allow for an end-to-end network and would provide a processing delay of 16.7 milliseconds, in particular implementations of grid system 10, the sampling rate may be as high as seventy-two thousand (7,200) samples/second. Seventy two thousand (7,200) samples/second would allow for an end-to-end network and provide a processing delay of 138.9 microseconds. Additionally, network latency is made up of message transmit serialization delay, message propagation delay in a medium, message receive serialization delay, message switching (or forwarding) delay, message queuing delay message output delay (i.e., represents any message of equal or lower priority, which is serialized out of the link), etc. Propagation of light across two hundred (200) kilometers (kms) of fiber can take approximately one (1) millisecond (the speed varies depending on the material used to construct the fiber, etc.). The message switching time (e.g., in an application specific integrated circuit (ASIC)-based system) can lie between five hundred (500) nanoseconds to about fifty (50) microseconds.

In operation, grid system 10 is configured to provide for an end-to-end low latency and low jitter path. This is achieved by using an end-to-end hardware accelerated path. In certain implementations, ASIC forwarding engines can be employed to foster predictable latency (e.g., two (2) or three (3) hops, as compared to variable hops (typically over three (3)). In a particular embodiment, a circuit-like explicit static path setup exists for an improved control of the network data. Multiple technology choices exist for routing traffic including multiprotocol label switching traffic engineering (MPLS-TE) and MPLS transport profile (MPLS-TP). Grid system 10 can also offer a predictable failover, along with appropriate network convergence. This can include MPLS-TE based fast reroute, MPLS-TP based path protection, network redundancy, and predictable failover after one failure. Grid system 10 may include an MPLS-based core WAN network in certain example implementations of the present disclosure. The converged network may be able to carry both IP and non-IP traffic (e.g., IEC 61850 GOOSE, etc.) even over a WAN.

Grid system 10 can additionally offer a scalable network that minimizes packet replication, replicates packets at designated points, and integrates cryptography without burdening packet replication at the end host. Grid system 10 may also offer fault resiliency, and predictable quality of service (QoS) guarantees. As a result, the last node is not compromised, where limited fault domains are provided. In addition, leaf node failure does not affect the entire grid architecture. For example, switch or link failure impacts traffic going through grid system 10, where the addition of a new leaf switch is hitless (i.e., does not bring down the network). In addition, the elimination of PDC stacking may also be realized. Further, PMU traffic can be multicasted (which offers lower and more predictable latency).

Grid system 10 may employ multicasting technologies for a number of reasons. For example, one source may have multiple interested receivers seeking the same data such that multicasting would readily address this issue. In addition, multicasting can achieve an efficient bandwidth utilization, while the traffic can be IP/UDP encapsulated. Moreover, multicasting offers an efficient PMU computation and communication resource utilization to be enabled. Multicasting also allows membership lists to be suitably managed. The PMU may not need to be burdened with managing the receivers, which are authorized to receive or view the traffic on grid system 10.

Note that without such multicasting activities, PMUs would be relegated to point-to-point communications and be involved in PDC stacking, which significantly degrades network performance. Aside from multicasting, other publish and subscribe services and protocols can readily be used in the context of the present disclosure. For example, such services and protocols can include the use of enterprise server buses, message brokers, etc., although this may create additional overhead and may be less efficient.

Separately, security issues for PMU data traffic may involve low predictable latency security features in the architecture. For example, both in terms of security and information visibility, the architecture of grid system 10 can provide appropriate protocols for managing data, content jamming protection, port security, and IPv4/IPv6 source guarding, etc. Wire speed cyber security may be achieved with no latency penalty, where strict RPF can be enforced at L3 boundaries. In one embodiment, multicast access control lists (ACLs) can form a second line of defense for PMU traffic leaving a secure network. ACLs on the network deny PMU traffic except for an S/G that has been permitted by a PMU manager. ACLs can be enforced in grid system 10 with little increased latency.

There are two proposed directions for PMU data transfer. These include a middleware-based solution, chaining approaches, PDC stacking, etc. These approaches can suffer from various drawbacks such as a lack of adequate scalability in the solution, few operational field deployments, and the introduction of detrimental performance affects, which may include adding significant PMU message propagation delay. In addition, non-standard implementations may vary from any standardization across vendors.

PMUs 26 typically conduct measurements of a target subject and package the PMU data (i.e., results of the measurements) into one of various formats such as GOOSE, SV, C37.118-2005, and IEC 61850-90-5. The use of IP within various protocol documents related to GOOSE and SV messages are typically encapsulated directly into Ethernet frames without IP, which constricts the scope for the transfer of data geographically. Adequate transport of GOOSE and SV messages across the WAN can require use of an end-to-end transport protocol. Separately, both C37.118-2005 and IEC 61850-90-5 specify the use of the IP protocol transport (either IP multicast or unicast).

PMU measurement messages transmitted (using IP) can be transmitted using IP unicast to predefined receivers that are typically PDCs 28 or Super-PDCs (i.e., integrated PDC functionality and service applications within a single unit). The IP transport layer protocol widely used is UDP. However, some implementations utilize TCP for PMU control/ configuration and/or data transfer. GOOSE and SV messages typically remain within the confines of the LAN nearby, where they originate or where they are transferred by collector service applications using a backhaul process interconnect after being locally consumed. Implementations utilizing Ethernet virtual LAN (VLAN) framed messages are also employed, but still suffer from various limitations when implemented in WAN environments.

PDCs 28 can receive PMU data and concentrate (or combine) the PMU data into a unified output stream. PDCs 28 can also time-synchronize the messages for temporal relevance by correlating their timestamps (originally instantiated at PMU 26) against each other. PDC 28 can then output this combined message stream to another PDC 28 (referred to as PDC stacking, when PMU messages traverse multiple daisy-chained PDCs 28 on their journey to an operations center or control center 14). Eventually the PMU messages arrive at an operations center. Along the path from PMU 26 to the operations center, various actions (e.g., local protection, tele-protection, etc.) can be performed at intermediate points (e.g., substations 12 that might be along the network path) based on an evaluation of the PMU measurements and their comparison to PMU measurements from other parts of the utility grid or from other utility grids. In addition, PMU measurement data may also travel external to the local utility, for example, to a regional entity such as an ISO/RSO.

The dependence on PDC forwarding (or in the case of an alternate proposed middleware solution, a middleware entity that forwards the PMU data) introduces a number of negative effects that can have an impact on delay, jitter, scalability of the system, availability of the system, etc. By removing PDCs 28 and other non-networking entities from the network path between PMU 26 and any PMU data consuming entity (be they PDCs 28, PMU data consumers 70, middleware components, etc.), a positive impact on how the network performs may be achieved. Additionally, this configuration reduces the complexity of management of the network and, as the PMU network grows, scaling becomes less complex.

Implementation of an IP multicast architecture for PMU networking can have a positive impact on the functions of grid system 10. Using a multicast architecture reduces the complexity of management of the network and allows grid system 10 to scale with PMU 26 deployment and application complexity. IP multicast can have benefits such as a vast scalability in terms of resource efficiency (e.g., bandwidth), as well as a large number of receivers that can be supported (essentially infinite). IP multicast also offers a viable, tested technology base that supports intra-domain and inter-domain architectures, where service component adaptation is not complex. However, most PMUs 26 transmit data using IP unicast. To alleviate this issue, conversion from unicast to multicast (external to PMU 26 itself) can be implemented to accommodate legacy PMUs that cannot transmit using IP multicast. As such, a given PMU 26 has been activated for message transmission, PMU 26 will output a continuous stream of packets (typically one or more usually up to a maximum of four destinations) toward a preconfigured destination.

In one example implementation, the PMU messages are transmitted to FHR 32 or to a gateway on a local network to which PMU 26 is logically connected. FHR 32 can be the first node in a multicast tree from the source (PMU 26) to the destination (i.e., a device such as PDC 28, PMU data consumer 70, or another application service component located at an intermediate point in the network, at an operations center, a control center, or in another network domain). Once PMU 26 has been instructed to begin transmitting, it will transmit to FHR 32 regardless of whether there are receivers present. If there are no receivers present, FHR 32 will drop or discard the PMU packets until the receivers come on-line.

In essence, PMU 26 can be transmitting to hosts (referred to as application service components) that are located in a network, other than the local network (i.e., rather than being located inside the local network and part of the forwarding path). These hosts are not necessarily participating in the forwarding of the messages from the PMU. Such hosts are referred to as called receivers in IP multicast terminology. The receivers may be PMU data centers 70, or any other appropriate network node.

In order for PMU messages to be forwarded from FHR 32 to their appropriate destination, one or more destinations, or receivers should be active within the multicast implementation. In order to become active, a receiver should signal to the network that it wishes to receive traffic from a specific multicast source. This source is usually specified using an (S,G) pair. "S" represents the IP unicast address of the source (i.e., PMU 26) and "G" represents the group address that associates the set of receivers that will receive traffic from the specific source. The group address is also referred to as a multicast address (also known as a Class E address). The group address is used in a multicast routing table to identify the downstream (i.e., towards the receivers) egress ports on a router to which the specific multicast traffic can be transmitted in order to reach one or more receivers for specific traffic. FHR 32 can transmit each IP packet, which contains a PMU message, using the group address "G" in the IP destination address field and the source address "S" in the IP source address field.

A receiver (such as PDC 28, PMU data consumer 70, or other application service component) that seeks to receive traffic from a specific source PMU 26 (e.g., source Sa) may utilize the Internet Group Management Protocol (IGMP) Version 3, which supports protocol independent multicast source specific multicast (PIM-SSM). The receiver may signal to the local gateway router (where the gateway is also acting as LHR 64 in this instance) that it wishes to receive traffic from the specific source, Sa. The receiver should also specify that it belongs to a group address, Ga.

To enable coordinated system-wide measurements from multiple PMUs 26, the data (e.g., synchrophasor measurements) from each PMU 26 may have a time tag or stamp (e.g., a universal time coordinated (UTC) time tag or stamp). In one example, the time tag consists of three numbers: a second-of-century (SOC) count, a fraction-of-second count, and a time status value. The SOC count is a four (4)-byte binary count in seconds from midnight (00:00) of Jan. 1, 1970, to the current second. Leap seconds can be added to (or deleted from) this count to keep it synchronized with the UTC time. Insertion of a leap second can result in two successive seconds having the same SOC count, which are differentiated by the leap second bit in a FRACSEC word. Using this convention, time count can be determined from the current time by multiplying the number of days since Jan. 1, 1970 (1/1/70) by the number of seconds per day, eighty-six thousand and four hundred (86,400). The SOC timestamp is the same as is used by the UNIX computer system, and similar to those used by other computer systems including DOS, MAC OS, and networks [i.e., network time protocol (NTP)].

The seconds can be divided into an integer number of subdivisions by a TIME_BASE integer. A fraction of a second count can be an integer representing the numerator of the fraction of a second with the TIME_BASE serving as the denominator. Compatibility with IEC 61850:2000 can include a TIME_BASE value of two raised to the power of twenty-four (2^24). The fraction of a second count can be zero (0) when it coincides with a one (1) second rollover. The time tag may be applied to each of the communication frames.

Synchrophasor measurements can be synchronized to UTC time with accuracy sufficient to meet the accuracy requirements. Note that a time error of one (1) second corresponds to a phase error of 0.022° for a sixty (60) Hertz (Hz) system and 0.018° for a fifty (50) Hz system. A phase error of 0.01 radian or 0.57° will by itself cause a 1% total vector error (TVE). This corresponds to a maximum time error of plus-or-minus twenty-six (±26) seconds for a sixty (60) Hz system, and plus-or-minus thirty-one (±31) seconds for a fifty (50) Hz system. The system should be capable of receiving time from a highly reliable source, such as a Global Positioning System (GPS) element, which can provide sufficient time accuracy to keep the total vector error (TVE) within the required limits and, further, provide an indication of loss of synchronization. A flag in the data output can be provided to indicate that a loss of time synchronization can be asserted when a loss of synchronization would cause the TVE to exceed the limit, or within one (1) minute of an actual loss of synchronization, whichever is less. The flag can remain set until data acquisition is resynchronized to the designated accuracy level.

Turning to FIG. 2A, FIG. 2A is a simplified block diagram illustrating one possible set of details associated with the present disclosure. FIG. 2A includes PMU 26, FHR 32, routers 38, LHRs 64, first network 66, second network 68, and PMU data consumers 70 (i.e., subscriber). FHR 32 may include unicast to multicast module 86. Unicast to multicast module 86 may include a processor 88b, and a memory 90b. PMU data consumers 70 can include a processor 88c and a memory 90c in a particular implementation of the present disclosure.

In operation, unicast to multicast module 86 is configured to convert a unicast transmission of PMU data in to a multicast transmission. For example, PMU 26 can send PMU data in a unicast transmission 72 to FHR 32. FHR 32 is the first node in a multicast tree and FHR 32 converts the unicast transmission 72 of the PMU data to a multicast transmission 74 of the PMU data. Multicast transmission 74 can be subsequently communicated to PMU data consumers 70.

Multicast transmission 74 of the PMU data traverses first network 66 and/or second network 68 to LHR 64. LHR 64 is the gateway from first network 66 or second network 68 to PMU data consumer 70. By converting the unicast PMU data transmission to a multicast transmission, PDC stacking or chaining can be avoided. The multicast transmission from FHR 32 can allow for adequate scalability, alleviate the introduction of detrimental performance affects (e.g., adding to PMU message propagation delay), and allow for non-standard implementations that may vary from any standardization across vendors. In addition, each PMU 26 does not have to replicate traffic, nor manage membership lists of subscribers or PMU data consumers, which are interested in the PMU data.

Turning to FIG. 2B, FIG. 2B is a simplified block diagram illustrating one possible set of details associated with substation 12. Substation 12 can include PMUs 26, PDC 28, switches 30 (i.e., aggregation switches and access switches), and FHRs 32. PMUs 26 may include a processor 88e and memory 90e in a particular implementation of the present disclosure. PDC 28 may also include a processor 88d and a memory 90d. FHRs 32 may include a unicast to multicast module 86, which may include a processor 88b and a memory 90b in a particular example. PMUs 26 may be reflective of a dedicated device, or can be incorporated into a protective relay or other device. In addition, PMUs 26 may be dispersed throughout grid system 10 to form a phasor network, where they are configured to measure the electrical waves on grid system 10 using a common time source for synchronization. The common time source may be provided by a GPS clock 82, as is illustrated in FIG. 2B.

The placement of PMUs 26 can be determined based on two major factors: system characteristic and intended application. Regarding the system characteristic, topology configuration (system size, node location, weak nodes and power flow pattern, etc.) and communication ability (available channels, bandwidth limit, time delay, etc.) can influence the provisioning of PMUs 26. Topology configuration and communication ability are important to PMUs 26 placement because they can determine the potential PMU sites and communication pattern, which can form the strategy for PMUs 26 provisioning.

The application of out-of-step protection suggests that the placement of PMUs 26 should be performed by factoring in the observability of the generator rotor angle in real-time. The situation becomes more complicated when multiple applications are required. As a result, different PMUs 26 placement schemes may be developed first, where those schemes are evaluated together and a final optimal scheme can be resolved using various methodologies. PDC 28 can form a node in a system, where PMU data (i.e., phasor data) from a number of PMUs 26 (or PDCs 28) can be correlated (by time-tag) to create a measurement set. PDC 28 may provide additional functions as well such as performing various quality checks on the PMU data, insertion of appropriate flags into the correlated data stream, etc. PDC 28 may also monitor the overall measurement of substation 12 and, further, provide a display and a record of performance.

In operation, PDC 28 can serve as the hub of the measurement system, where data from a number of PMUs 26 or other PDCs 28 is brought together, and then fed out to other applications. PDC 28 can also be configured to perform extensive functions in the measurement system, buffer the data stream internally, and spool the data to other applications. In addition, PDC 28 can send out a continuous stream of a more comprehensive data set over an Ethernet link, or it can send out selected data based on an application or a flag status. PDC 28 is also configured to monitor the overall network and, further, may include a network client program for user access. A specific program on PDC 28 can indicate system disturbances and subsequently record a file that documents the disturbance.

Switches 30 can connect the network components of substations 12. GPS clock 82 can be included within switches 30 to provide a precise timing mechanism. This could allow for the synchrophasor measurement of voltage and current on grid system 10, as well as synchronization of data from PMUs 26. Switches 30 can connect PMUs 14 and PDC 28 to first-hop routers 32. First-hop routers 32 (or gateways) are reflective of the first node in a multicast "tree" from the source (a PMU 26) to the destination (e.g., a device such as an application service component located at an intermediate point in grid system 10, PMU data consumer 70, control center 14, a NERC control center, a RTO control center, utility bar substation 24, etc.). First-hop routers 32 can receive data from PMUs 26 and PDC 28 and then communicate the data across first network 66 to PMU data consumers 70 (i.e., subscribers).

Note that because FIGS. 2C-1 and 2C-2 are related, their capabilities and functionalities are discussed together. FIGS. 2C-1 and 2C-2 are simplified block diagrams illustrating one possible set of details associated with a portion of grid system 10. More specifically, FIG. 2C-1 may include substation 12, first network 66, and control center 14. In this particular example, substation 12 may include first PMU 26a, second PMU 26b, PDC 28, substation network 84, and FHR 32. Control center 14 may include LHR 64, control center network 98, and PMU data consumers 70 in this particular configuration. In addition, FIG. 2C-2 may include substation 12, control center 14, second network 68, second control center 20, third control center 22, and utility bar substation 24. Second control center 20 may include LHR 64, control center network 98 (e.g., a NERC control center network), and PMU data consumers 70. Third control center 22 may include LHR 64, control center network 98 (e.g., a RTO control center network), and PMU data consumers 70. Utility bar substation 24 may include FHR 32, substation network 84, and PMUs 26 in a particular implementation of the present disclosure.

In operation, first PMU 26a is configured to generate a first PMU data signal 94 and second PMU 26b is configured to generate a second PMU data signal 96. PDC 28 and one or more PMU data consumers 70 may seek to receive first PMU data signal 94 and/or second PMU data signal 96. However, PMU 26a and PMU 26b can typically unicast PMU data signals.

To transmit the PMU data to multiple PMU data consumers 70, PMU 26a and PMU 26b can unicast PMU data to FHR 32. FHR 32 may include unicast to multicast module 86 (shown in FIGS. 2A and 2B). A specific PMU data consumer 70 can communicate with FHR 32 and indicate that the specific PMU data consumer 70 seeks to receive the PMU data. For example, four PMU data consumers 70 (two PMU data consumers 70 from control center 70, one in second control center 20, and one in third control center 22) may request first PMU data signal 94 from first PMU 26a and two PMU data consumers 70 (two PMU data consumers 70 from control center 70) may request second PMU data signal 96 from second PMU 26b. Second PMU data signal 96 may contain only the voltage recorded by second PMU 26b, while first PMU data signal 94 may contain additional data.

PMU data consumers that requested the PMU data can be added to a multicast group list in FHR 32 (e.g., the group list stored in memory 90b of unicast to multicast module 86). After receiving the unicast transmission from PMU 26a and PMU 26b, FHR 32 is configured to convert the unicast transmission to a multicast transmission. For example, first PMU data signal 94 may start as a unicast transmission from first PMU 26a to FHR 32. At FHR 32, first PMU data signal 94 can be converted to a multicast transmission and subsequently communicated to the four PMU data consumers 70, which requested first PMU data signal 94. Similarly, second PMU data signal 96 may start as a unicast transmission from second PMU 26b to FHR 32. At FHR 32, second PMU data signal 94 can be converted to a multicast transmission and subsequently communicated to the two PMU data consumers 70, which requested second PMU data signal 98.

Figure 2D:
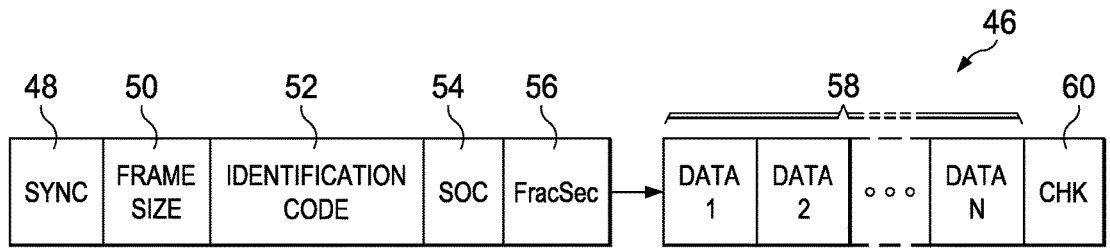
FIG. 2D is a simplified block diagram illustrating possible example details associated with one embodiment of the present disclosure.

Turning to FIG. 2D, FIG. 2D is a simplified block diagram illustrating one possible set of details associated with a data frame 46 for use in grid system 10. Data frame 46 may include a SYNC field 48, a FRAMESIZE field 50, an ID CODE field 52, a SOC field 54, a FRACSEC field 56, a data section 58 (which may include data fields), and a CHK field 60. Data messages can reflect the measurements made by a given PMU. One possible organizational example of data frame 46 is illustrated below as TABLE 1.

TABLE 1

Data frame organization

| No. | Field | Size (bytes) | Comment |
| --- | --- | --- | --- |
| 1 | SYNC | 2 | Sync byte followed by frame type and version number. |
| 2 | FRAMESIZE | 2 | Number of bytes in frame, defined in 6.2. |
| 3 | IDCODE | 2 | PMU/DC ID number, 16-bit integer, defined in 6.2. |
| 4 | SOC | 4 | SOC time stamp, defined in 6.2, for all measurements in frame. |
| 5 | FRACSEC | 4 | Fraction of Second and Time Quality, defined in 6.2, for all measurements in frame. |
| 6 | STAT | 2 | Bitmapped flags. |
| 7 | PHASORS | 4 × PHNMR or 8 × PHNMR | Phasor estimates as defined in Clause 5. May be single-phase or 3-phase positive, negative, or zero sequence. Values are 4 or 8 bytes each depending on the fixed 16-bit or floating-point format used, as indicated by the configuration frame. |
| 8 | FREQ | 2/4 | Frequency (fixed or floating point). |
| 9 | DFREQ | 2/4 | Rate of change of frequency (fixed or floating point). |
| 10 | ANALOG | 2 × ANNMR or 4 × ANNMR | Analog data, 2 or 4 bytes per value depending on fixed- or floating-point format used, as indicated by the configuration frame. |
| 11 | DIGITAL | 2 × DGNMR | Digital data, usually representing 16 digital status points (channels). |
|  | Repeat 6-11 |  | Fields 6-11 are repeated for as many PMUs as in NUM_PMU field in configuration frame. |
| 12+ | CHK | 2 | CRC-CCITT |

In an embodiment, frames used in grid system 10 can include four message types: data, configuration, header, and command. The first three message types can be transmitted from the PMU/PDC, where the command message type is received by PMU 26/PDC 28 and is used in the control of PMU 26. Frames in grid system 10 may begin with a two (2)-byte SYNC word in SYNC field 48. The SYNC word can provide synchronization and frame identification and bits four (4)-six (6) in the SYNC word can designate the frame type. FRAMESIZE field 50 may include a two (2)-byte FRAMESIZE word. ID CODE field 52 may include a two (2)-byte IDCODE and SOC field 54 may include a timestamp consisting of a four (4)-byte SOC. FRACSEC field 56 may include a four (4)-byte fraction of second, which includes a twenty-four (24)-bit fraction-of-second integer and an eight (8)-bit Time Quality flag. IDCODE positively identifies the unit sending or receiving the message.

The frames can terminate in the check word (CHK), for example, CRC-CCITT. CRC-CCITT can use the generating polynomial X16+X12+X5+1 with an initial value of negative one ((−1) (hex FFFF) and no final mask. Frames (e.g., data frame 46) in grid system 10 can be transmitted with no delimiters. The SYNC word can be transmitted first and the check word (i.e., CHK) last. Two (2) and four (4)-byte words can be transmitted most significant byte first (network or "big endian" order). Example word definitions that may be common to types of frames propagating in grid system 10 are provided below in TABLE 2.

TABLE 2

Word definitions common to all frame types

| Field | Size (bytes) | Comments |
|---|---|---|
| SYNC | 2 | Frame synchronization word.<br>Leading byte: AA hex<br>Second byte: Frame type and Version, divided as follows:<br>Bit 7: Reserved for future definition<br>Bits 6-4: 000: Data Frame<br>001: Header Frame<br>010: Configuration Frame 1<br>011: Configuration Frame 2<br>100: Command Frame (received message)<br>Bits 3-0: Version number, in binary (1-15), version 1 for this initial publication. |
| FRAMESIZE | 2 | Total number of bytes in the frame, including CHK.<br>16-bit unsigned number. Range = maximum 65535. |
| IDCODE | 2 | PMU/DC ID number, 16-bit integer, assigned by user, 1 to 65 534 (0 and 65 535 are reserved). Identifies device sending and receiving messages. |
| SOC | 4 | Time stamp, 32-bit unsigned number, SOC count starting at midnight 01-Jan-1970 (UNIX time base).<br>Ranges 136 yr, rolls over 2106 AD.<br>Leap seconds are not included in count, so each year has the same number of seconds except leap years, which have an extra day (86 400 s). |
| FRACSEC | 4 | Fraction of Second and Time Quality, time of measurement for data frames or time of frame transmission for non-data frames.<br>Bits 31-24: Time Quality as defined in 6.2.2.<br>Bits 23-00: Fraction-of-second, 24-bit integer number. When divided by TIME_BASE yields the actual fractional second. FRACSEC used in all messages to and from a given PMU shall use the same TIME_BASE that is provided in the configuration message from that PMU. |
| CHK | 2 | CRC-CCITT, 16-bit unsigned integer. |

Data frame 46 may include measured data and be identified by having bits four (4)-six (6) in the SYNC field 47 set to zero (0). The configuration can be a machine-readable message describing the configuration data that can be sent by/or to PMU 26/PDC 28 (where calibration factors may also be provided). Header information can be human-readable descriptive information sent from PMU 26/PDC 28 and provided by the user. Commands can be machine-readable codes sent to PMU 26/PDC 28 for control or configuration. Information may be stored in any convenient form in PMU 26/PDC 28 itself, but when transmitted it can be formatted as frames. In certain implementations, fields may be of a fixed-length, having no delimiters.

One possible implementation associated with word definitions for data frame 46 is illustrated in TABLE 3.

TABLE 3

Word definitions unique to data frames

| Field | Size (bytes) | Comments |
|---|---|---|
| STAT | 2 | Bitmapped flags.<br>Bit 15: Data valid, 0 when PMU data is valid, 1 when invalid or PMU is in test mode. |

TABLE 3-continued

Word definitions unique to data frames

| Field | Size (bytes) | Comments |
|---|---|---|
| | | Bit 14: PMU error including configuration error, 0 when no error. |
| | | Bit 13: PMU sync, 0 when in sync. |
| | | Bit 12: Data sorting, 0 by time stamp, 1 by arrival. |
| | | Bit 11: PMU trigger detected, 0 when no trigger. |
| | | Bit 10: Configuration changed, set to 1 for 1 min when configuration changed. |
| | | Bits 09-06: Reserved for security, presently set to 0. |
| | | Bits 05-04: Unlocked time: 00 = sync locked, best quality |
| | | 01 = Unlocked for 10 s |
| | | 10 = Unlocked for 100 s |
| | | 11 = Unlocked over 1000 s |
| | | Bits 03-00: Trigger reason: |
| | | 1111-1000: Available for user definition |
| | | 0111: Digital     0110: Reserved |
| | | 0101: df/dt high  0100: Frequency high/low |
| | | 0011: Phase-angle diff  0010: Magnitude high |
| | | 0001: Magnitude low  0000: Manual |
| PHASORS | 4/8 | 16-bit integer values: |
| | | Rectangular format: |
| | | Real and imaginary, real value first |
| | | 16-bit signed integers, range −32 767 to +32 767 |
| | | Polar format: |
| | | Magnitude and angle, magnitude first |
| | | Magnitude 16-bit unsigned integer range 0 to 65 535 |
| | | Angle 16-bit signed integer, in radians × $10^4$, |
| | | range −31 416 to +31 416 |
| | | 32-bit values in IEEE floating-point format: |
| | | Rectangular format: |
| | | Real and imaginary, in engineering units, real value first |
| | | Polar format: |
| | | Magnitude and angle, magnitude first and in engineering units |
| | | Angle in radians, range −π to +π |
| FREQ | 2/4 | Frequency deviation from nominal, in millihertz (mHz) |
| | | Range - nominal (50 Hz or 60 Hz) −32.767 to +32.767 Hz |
| | | 16-bit integer or 32-bit floating point. |
| | | 16-bit integer: 16-bit signed integers, range −32 767 to +32 767. |
| | | 32-bit floating point: actual frequency value in IEEE floating-point format. |
| DFREQ | 2/4 | Rate-of-change of frequency, in Hz per second times 100 |
| | | Range −327.67 to +327.67 Hz per second |
| | | Can be 16-bit integer or IEEE floating point, same as FREQ above. |
| ANALOG | 2/4 | Analog word. 16-bit integer. It could be sampled data such as control signal or transducer value. Values and ranges defined by user. |
| | | Can be 16-bit integer or IEEE floating point. |
| DIGITAL | 2 | Digital status word. It could be bitmapped status or flag. Values and ranges defined by user. |

Real-time data transmission can occur concurrently with the measurement process. If PMU 26 is to be used with other systems, where the PMU data information is to be transmitted in real-time, implementation of this protocol is used for conformity with a standard. If PMU 26 is used only for PMU data archiving or recording, then such a protocol is not required. (Implementation of additional protocols for PMU data communication is not restricted to the one disclosed herein, as any communication system, mechanism, or media may be used for data transmission.) Message frames can be transmitted in their entirety, as they are specified. When used with a stacked protocol such as the fieldbus message specification (FMS) or the IP paradigm, the frame (including SYNC field 48 and CHK field 60) can be written into (and read from) the application layer interface. When used with more direct systems (such as raw Ethernet or RS-232), the frame can also be sent with the CRC-CCITT, which assures data integrity. As a result, the message protocol may be used for communication with a single PMU 26, or with a secondary system that receives data from several PMUs 26. The secondary system may have its own user assigned ID code. The above protocol allows for identifying information, such as the PMU IDCODE and status, to be imbedded in data frame 46 for proper interpretation of the measured data.

Figure 2E:
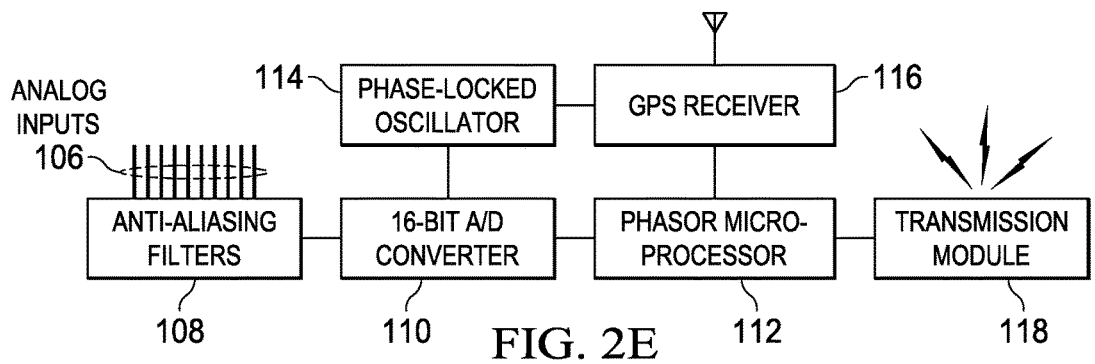
FIG. 2E is a simplified block diagram illustrating possible example details associated with one embodiment of the present disclosure.

Turning to FIG. 2E, FIG. 2E is a simplified block diagram illustrating one possible set of details associated with a portion of grid system 10. FIG. 2E may include a set of analog inputs 106, multiple anti-aliasing filters 108, an analog-to-digital (A/D) converter 110, a phasor microprocessor 112, a phase-locked oscillator 114, a GPS receiver 116, and a transmission module 118. In one example, analog input signals are obtained from the secondaries of voltage and current transformers and received at analog inputs 106. The analog input signals are filtered by anti-aliasing filter 108 to avoid aliasing errors. Subsequently, the signals are sampled by A/D converter 110. A sampling clock can be phase-locked to the GPS time signal from GPS receiver 116. GPS receivers 116 can provide uniform timestamps for PMUs 26 at different locations, where phasor microprocessor 112 is configured to calculate the values of the phasor. The calculated phasors (i.e., phasor values) and other information can be transmitted to appropriate remote locations using transmission module 118. Transmission module 118 is configured to communicate data from PMU 26 using substation network 84.

In one example implementation, the synchrophasor representation X of a signal x(t) is the value given by Equation 1 below:

$$X = Xr + jXi = (Xm/\sqrt{2})e^{j\psi} = Xm/\sqrt{2}(\cos \psi + j \sin \psi)$$ Equation 1

$Xm/\sqrt{2}$ is the rms value of the signal x(t) and $\psi$ is its instantaneous phase angle relative to a cosine function at nominal system frequency synchronized to universal time coordinated (UTC). The angle is defined to be 0° when the maximum of x(t) occurs at the UTC second rollover [one (1) pulse per second (PPS) time signal], and negative ninety (−90)° when the positive zero crossing occurs at the UTC second rollover.

Figure 2F:
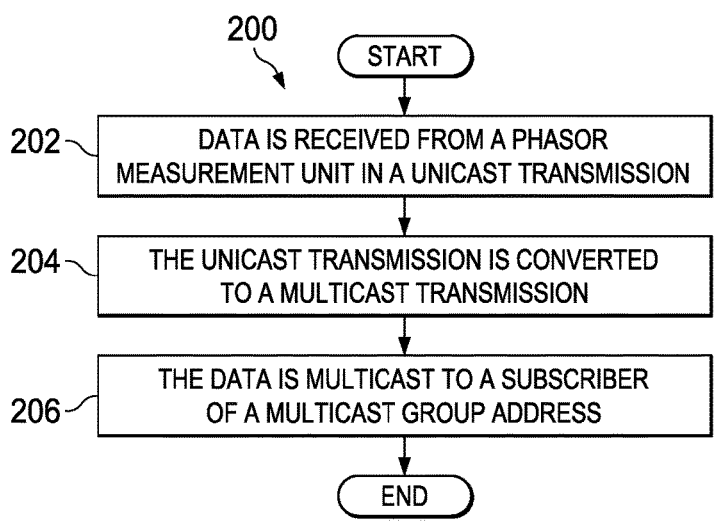
FIG. 2F is a simplified flow diagram illustrating potential operations associated with one embodiment of the present disclosure.

Turning to FIG. 2F, FIG. 2F is a simplified flowchart 200 illustrating one potential operation associated with the present disclosure. At 202, data can be received from a PMU in a unicast transmission. For example, first-hop router 32 may receive PMU data in a unicast transmission from PMU 26. At 204, the unicast transmission can be converted to a multicast transmission. For example, unicast to multicast module 86 may convert the unicast transmission into a multicast transmission in the network. At 206, the data is multicast to a subscriber of a multicast group address. For example, first-hop router 32 may multicast the data received from PMU 26 to PMU consumers 70 in control center 14, a NERC control center, a RTO control center, and/or utility bar substation 24.

Figure 2G:
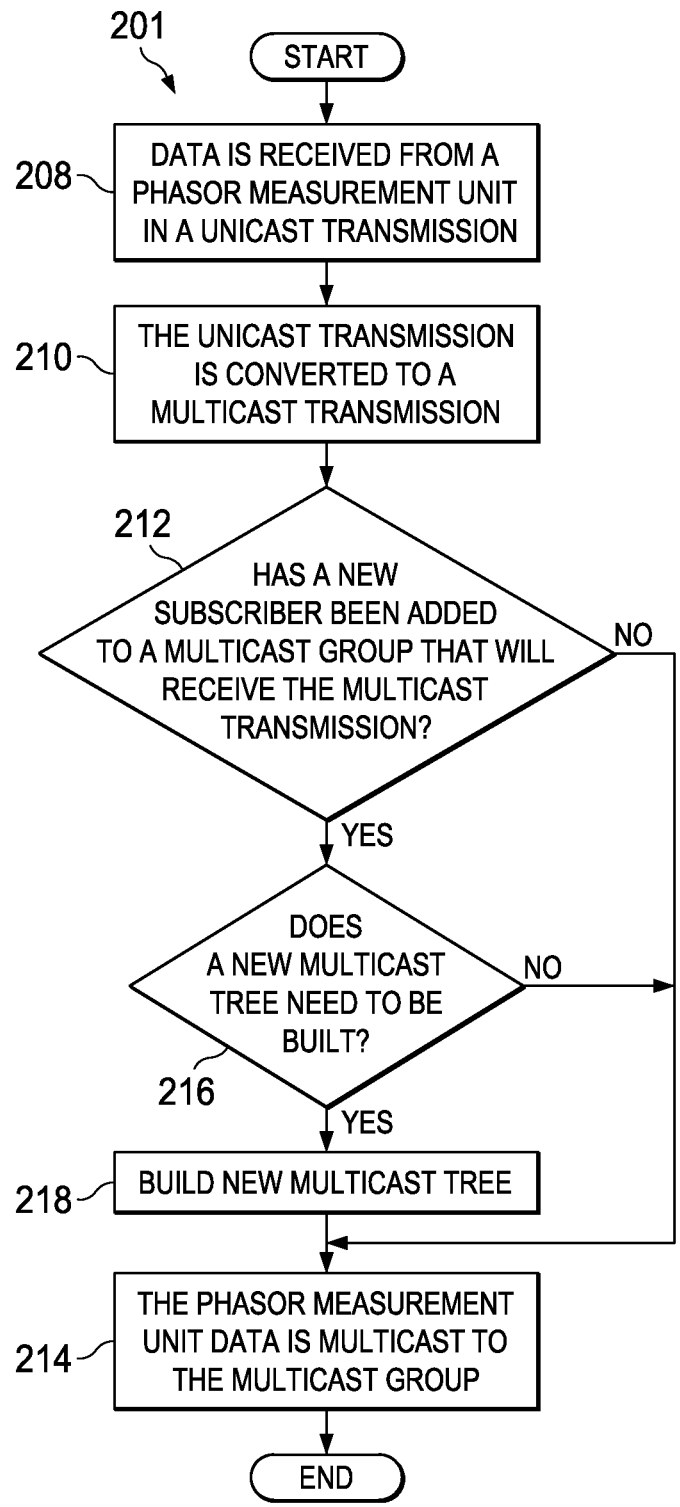
FIG. 2G is a simplified flow diagram illustrating potential operations associated with one embodiment of the present disclosure.

Turning to FIG. 2G, FIG. 2G is a simplified flowchart 201 illustrating one potential operation associated with the present disclosure. At 208, data is received from a PMU in a unicast transmission. For example, first-hop router 32 may receive data in a unicast transmission from PMU 26. At 210, the unicast transmission is converted to a multicast transmission. For example, unicast to multicast module 86 may convert the unicast transmission into a multicast transmission. At 212, the system determines if a new subscriber has been added to a multicast group that will receive the multicast transmission. For example, PMU data consumer 70 in control center 14 may join a multicast group of PMU data consumers 70 in a NERC control center, a RTO control center, and/or utility bar substation 24 to receive data from PMU 26.

If a new subscriber has not been added to the multicast group, then the PMU data is multicast to the multicast group, as illustrated in 214. In an embodiment, subscribers to the multicast group are identified by a multicast group address. If a new subscriber has been added to the multicast group, then the system determines if a new multicast tree should to be constructed, as illustrated in 216.

A multicast tree can be formed as a virtual minimum spanning tree (or a minimum connection of nodes), which connects members of the tree. The new multicast tree may need to be constructed to accommodate the new subscriber. For example, the multicast group of PMU data consumers 70 in a NERC control center, a RTO control center, and/or utility bar substation 24 may have a multicast tree that only goes through a NASPI WAN. To multicast data from PMU 26 to a PMU data consumer 70 in control center 14, a new multicast tree that goes through the corresponding WAN should to be constructed. If a new multicast tree should be constructed, then a new multicast tree is constructed, as illustrated in 218, and the PMU data is multicast to the multicast group, as illustrated in 214. If a multicast tree does not need to be built, then the PMU data is multicast to the multicast group, as illustrated in 214.

Figure 2H:
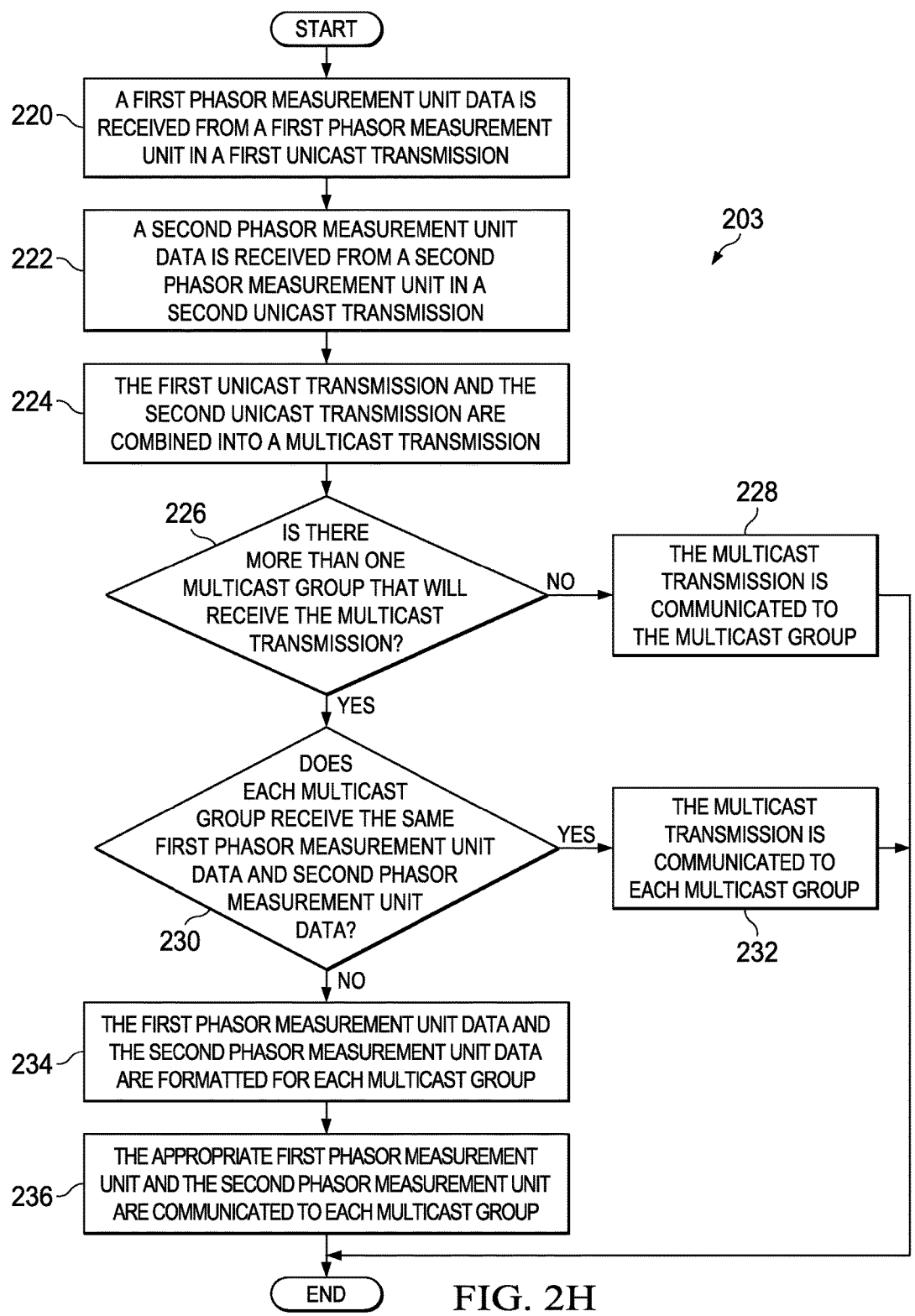
FIG. 2H is a simplified flow diagram illustrating potential operations associated with one embodiment of the present disclosure.

Turning to FIG. 2H, FIG. 2H is a simplified flowchart 203 illustrating one potential operation associated with the present disclosure. At 220, first PMU data is received from a first PMU in a first unicast transmission. At 222, second PMU data is received from a second PMU in a second unicast transmission. At 224, the first unicast transmission and the second unicast transmission are combined into a multicast transmission. At 226, the system is configured to determine if there is more than one multicast group that will receive the multicast transmission. If there is not more than one multicast group, then the multicast transmission (including the first PMU data and the second PMU data) is communicated to the multicast group, as illustrated in 228.

If there is more than one multicast group, then the system is configured to determine if each multicast group receives the same first PMU data and the same second PMU data, as is illustrated in 230. If each multicast group receives the same first PMU data and the same second PMU data, then the multicast transmission (including the first PMU data and the second PMU data) is communicated to each multicast group, as illustrated in 232. If each multicast group does not receive the same first PMU data and the same second PMU data, then the first PMU data and the second PMU data are formatted for each multicast group, as illustrated in 234. At 236, the appropriate first PMU data and the appropriate second PMU data are communicated to each respective multicast group.

Figure 3A:
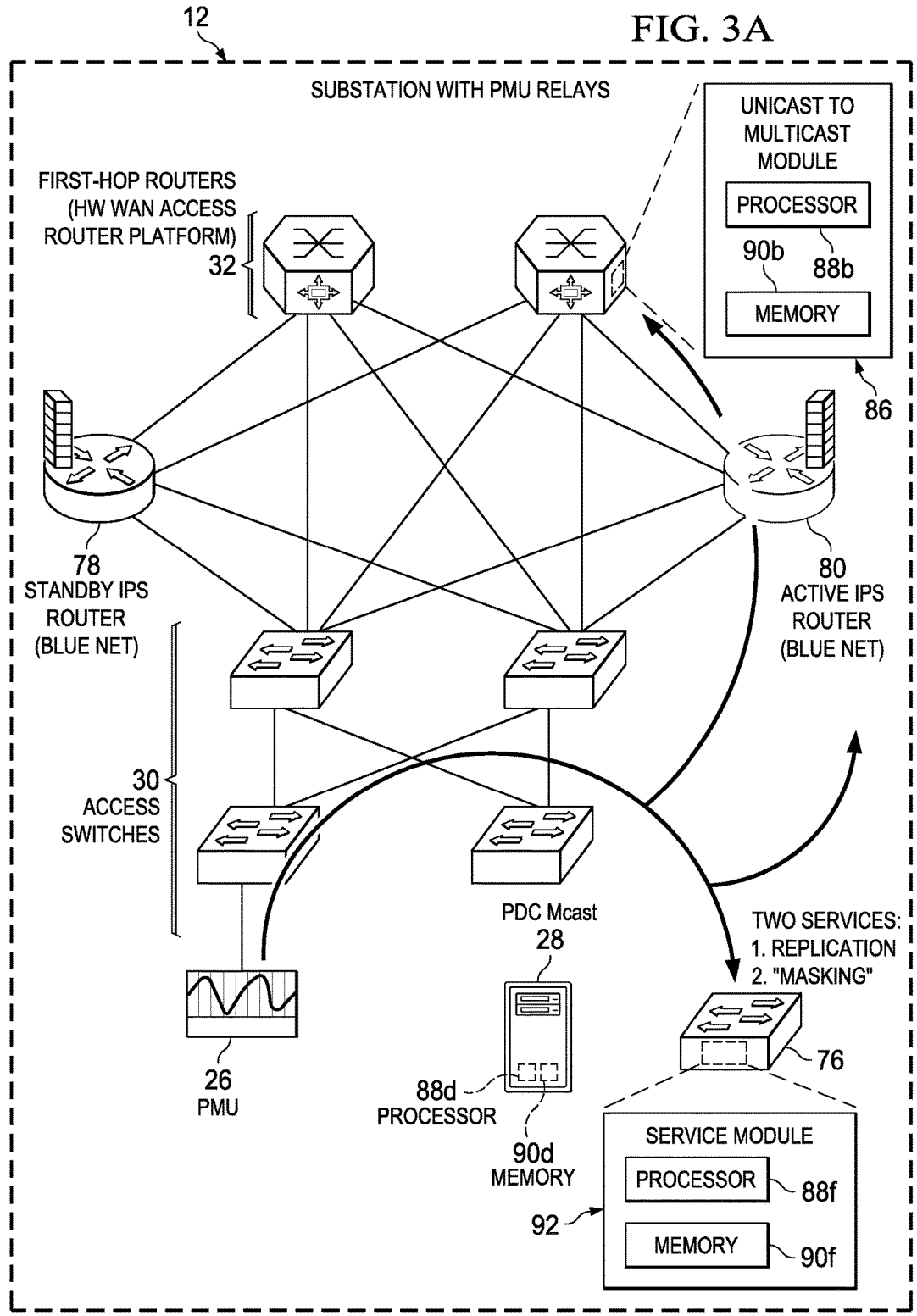
FIG. 3A is a simplified partial block diagram illustrating possible example details associated with one embodiment of the present disclosure.

Turning to FIG. 3A, FIG. 3A is a simplified block diagram illustrating one possible set of implementation details associated with substation 12. Substation 12 may include PMU 26, PDC 28, switches 30, FHR 32, a service device 76, a standby ISP router 78, and an active ISP router 80. Service device 76 may include a service module 92, a processor 88f, and a memory 90f. Service device 76 is configured to perform services on the PMU data and subsequently multicast the results of the service to subscribers. The services can be requested by PMU data consumer 70. For example, service device 76 is configured to perform service, replication, and masking activities. FHR 32 may include a unicast to multicast module for converting a unicast transmission of PMU data to a multicast transmission. The unicast to multicast module may include processor 88b and memory 90b. While service device 76 is shown in substation 12, service device 76 may readily be provisioned in other locations of grid system 10.

PMU data sent from PMU 26 can be redirected (via SIA) to service device 76. This can occur via a service insertion architecture (SIA) protocol, which can provide a platform-independent framework for service virtualization and dynamic service insertion into a network. For example, the devices at the edge of an SIA domain can classify the interested traffic: placing the classification result inside of a shared SIA context, and then redirecting the tagged packet to the next hop service in the SIA service path. Each service hop in the path receives the packet, uses the shared context to identify the traffic classification, and then applies the appropriate service policy associated with the SIA classification. After service application, the edge devices can derive the next hop in the service path associated with the shared context in the packet and then send the traffic to the next service node. The final service in the path removes the shared context from the packet and forwards the packet to the original destination.

The replication and masking services can occur at service module 90 without having to be inline, where the results of the service (i.e., service data) can be sent to the proper destinations. If only a subset of PMU traffic should be masked, then service module 90 can mask the subset of traffic, where non-masked traffic is not processed by masking services in service module 90 but simply sent to FHR 32. Service device 76 can be used to determine which packets require servicing. Service device 76 in grid system 10 can leverage metadata to ensure that the proper order of service is applied. Service metadata can be used by the network and by services to carry opaque information along the service path. The SIA control plane can ensure that services are functioning properly and, further, may also provide alternatives if the failure of services occur.

In a particular embodiment, services do not need to be placed inline and, therefore, do not affect network service level agreements (SLAs). Granularity can be applied for certain traffic in need of services, whereas other traffic does not. In addition, services can be added dynamically by communicating with service device 76, which can perform the added service. When another service is required, no network or existing service changes are required. Further, SIA pre/post service packets can be IP packets, where network forwarding remains relevant (e.g., TE, fast re-route, etc.).

SIA can provide an independent platform that offers a consistent architecture for adding high touch services to a network without requiring topology changes. For example, first service nodes (SNs) and service clients (SCLs) can register with a service directory/broker (SDB), which reflects any node/device within a network configured to store and to provide a consistent domain-wide view of available services. For instance, an SN may register with the SDB that it is able to provide firewall services for the network, while an SCL may register with the SDB that it desires firewall services. In response, the SDB returns a service header to each of the SN and SCL that is specific to the registered service.

According to another aspect of the architecture, certain traffic can be redirected with a prepended service header from SCLs to an appropriate SN in the network. This can occur independent of the physical location such that the SN may perform the services as requested by the service header (e.g., firewalling). In this manner, SCLs need not perform the services desired/required by the traffic, but may instead redirect the traffic to SNs within the network, which are specifically configured to provide such services. The traffic may then be forwarded from the SNs toward its destination after the services have been performed.

SIA can provide a common framework (e.g., HA, registration, etc.) for service abstraction. To the SIA framework, services look and feel the same, thus freeing the services to focus on service details. SIA can create a network awareness (when appropriate) in services, and a service awareness in the network. Topology abstraction can enable service deployment without complex network engineering. SIA elements can participate in a control plane and the control plane can provide service information (e.g., up/down, load, etc.), high availability, load distribution, and security (e.g., authentication, encryption, etc.). Services can be registered with a service broker (e.g., network element or PMU data consumer 70), and the service broker can determine which service device 76 can perform a requested service. The service broker may be a standalone unit or part of PMU data consumer 70.

Figure 3B:
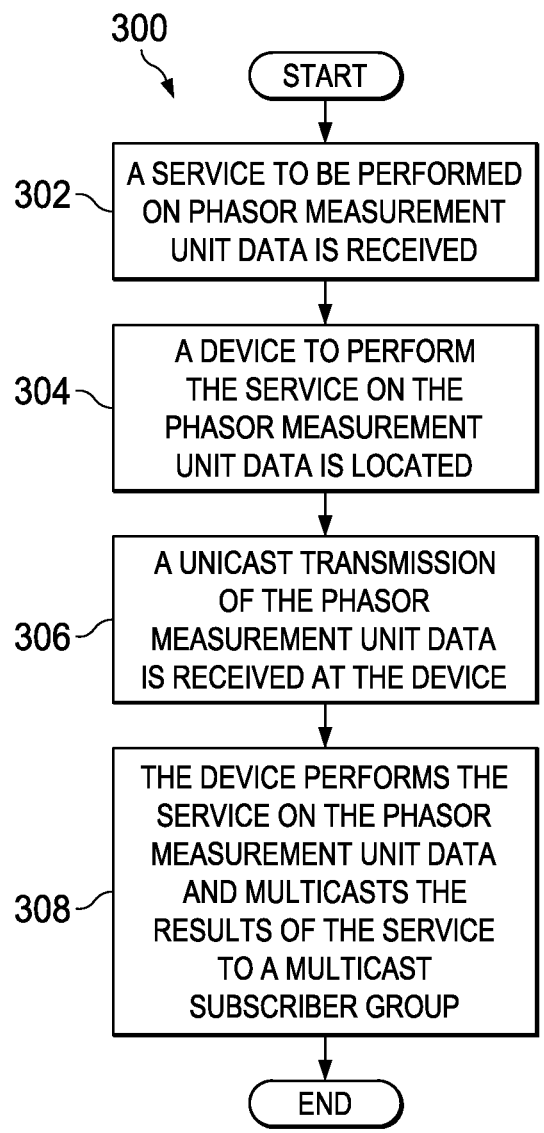
FIG. 3B is a simplified flow diagram illustrating potential operations associated with one embodiment of the present disclosure.

Turning to FIG. 3B, FIG. 3B is a simplified flowchart 300 illustrating one potential operation associated with the present disclosure. At 302, a service to be performed on PMU data is received. For example, a multicast group (or single PMU data consumer 70) can request that replication and masking be done on PMU data. At 304, a device to perform the service on the PMU data is identified. For example, service device 76 that can perform the replication and masking is identified in grid system 10. In addition, a multicast tree (that incorporates the multicast group and service device 76) may be created such that service device 76 is located near the multicast group, which requests the service. At 306, a unicast transmission of the PMU data is received at the device. In another embodiment, a multicast transmission of the PMU data from an FHR is received at the device. At 308, the device performs the service on the PMU data and then multicasts the results of the service to a multicast subscriber group.

Figure 3C:
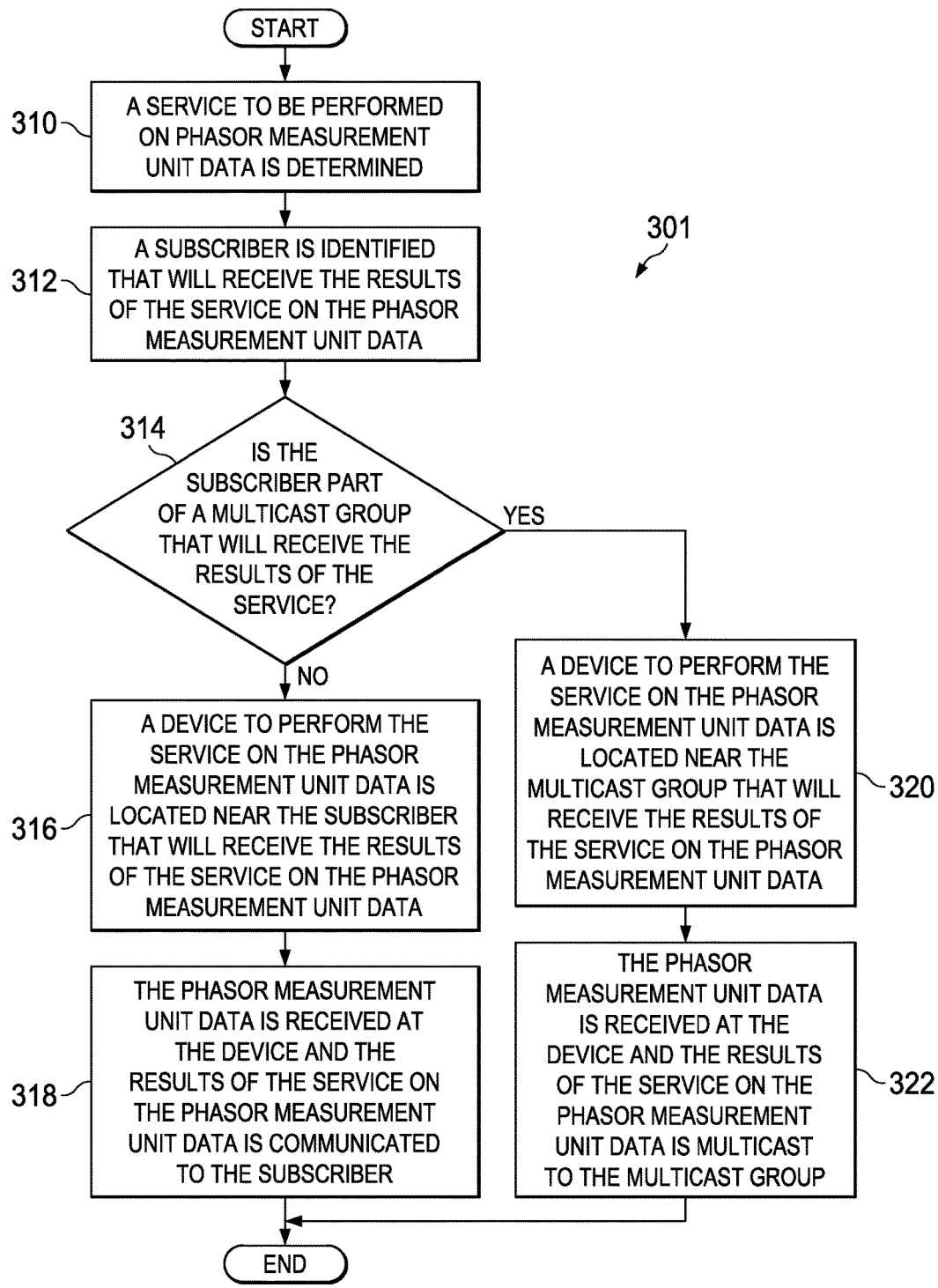
FIG. 3C is a simplified flow diagram illustrating potential operations associated with one embodiment of the present disclosure.

Turning to FIG. 3C, FIG. 3C is a simplified flowchart 301 illustrating one potential operation associated with the present disclosure. At 310, a service to be performed on PMU data is determined. At 312, a subscriber is identified for receiving the results of the service on the PMU data. For example, the subscriber may be PMU data consumer 70. At 314, the system is configured to determine if the subscriber is part of a multicast group, which will receive the results of the service. If the subscriber is not part of a multicast group that will receive the results of the service, then a device to perform the service is identified near the subscriber, which will receive the results of the service on the PMU data, as illustrated in 316. For example, service device 76 that will perform the service may be located near LHR 64 and PMU data consumer 70, which requested the service. At 318, the PMU data is received at the device, and the results of the service on the PMU data is communicated to the subscriber.

If the subscriber is part of a multicast group that will receive the results of the service, then a device to perform the service is identified near that multicast group, as illustrated in 320. For example, a multicast tree that incorporates the multicast group and service device 76 may be created such that service device 76 is located near the multicast group that requests the service. At 322, the PMU data is received at the device, and the results of the service on the PMU data can be multicast to the multicast group.

Figure 4:
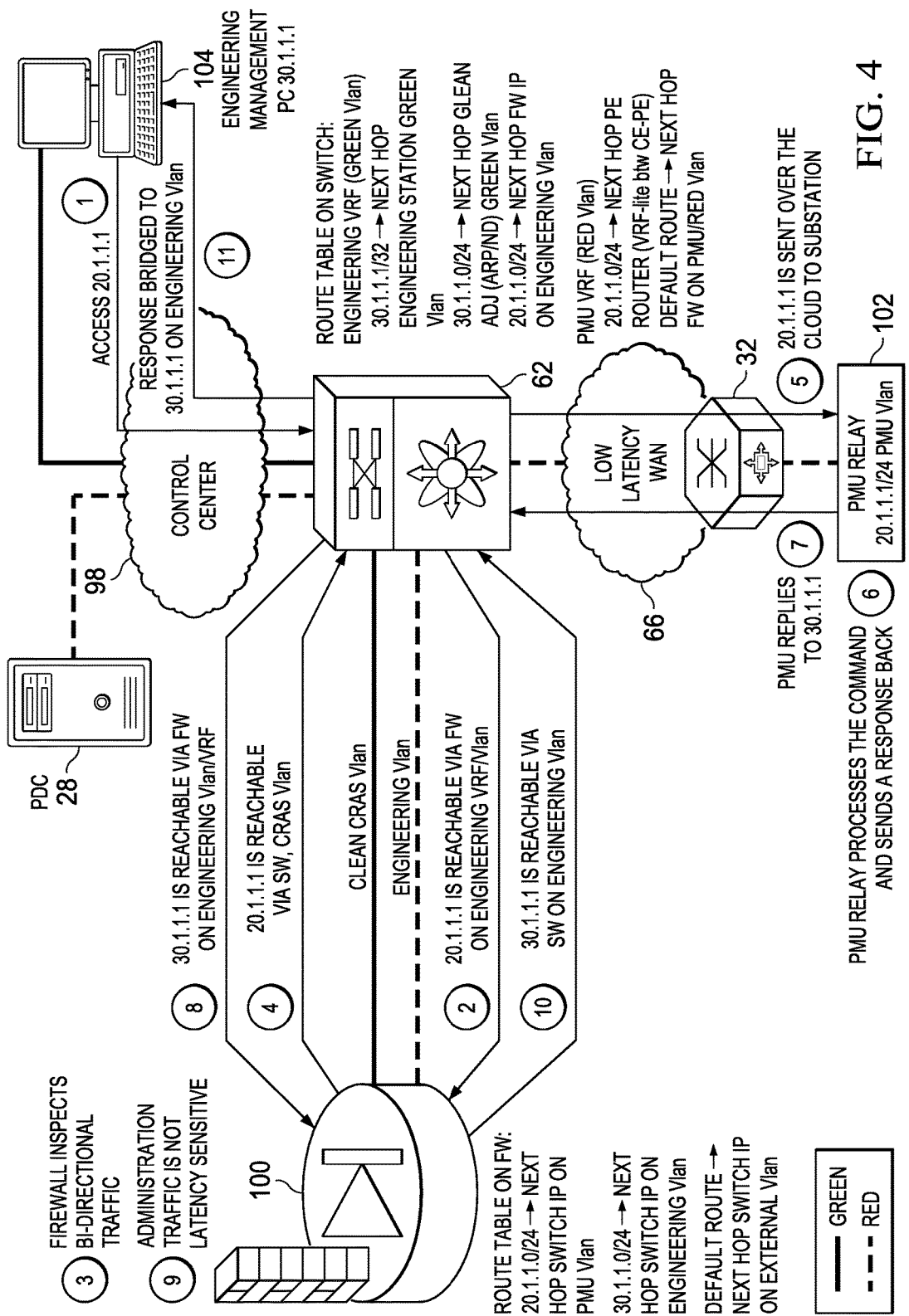
FIG. 4 is a simplified partial block diagram illustrating possible example details associated with one embodiment of the present disclosure.

Turning to FIG. 4, FIG. 4 is a simplified block diagram illustrating one potential operation associated with the present disclosure. FIG. 4 may include a PMU manager 104, PDC 28, control center network 98, network switches 62, a firewall module 100, first network 66, FHR 32, and a PMU relay 102. PMU data traffic can be communicated from PMU relay 102 to FHR 32. From FHR, the PMU data traffic can be communicated in a multicast transmission. Network switches 62 can be used to relay the PMU data traffic to the correct destination. A centralized remedial action scheme (CRAS) operation network intrusion prevention system (IPS) can operate in a promiscuous mode, where traversal of firewall module 100 is recommended for accessing any CRAS relay or server from a non-CRAS device. For example, because PMU manager 104 and PDC 28 are not on the same local network as PMU relay 102, firewall module 100 should be traversed before access to PMU relay 102 is allowed. In a particular embodiment, segmentation and path isolation for CRAS traffic may be provided.

In one example, crypto protection for traffic can allow an owner of PMU 26 to control PMU data that leaves a network (e.g., the network that may include PMU 26) by using ACLs. For example, a group crypto may be used for protecting PMU traffic. Using a group key to encrypt the PMU traffic allows the PMU traffic to be multicast efficiently and securely to multiple receivers. Concurrently, the group crypto may improve scalability of the system without compromising the security of the system. Further, by using crypto, the traffic is protected for confidentiality, integrity, and anti-replay. In addition, PMUs 26 do not have to deal with authentication of PMU data consumers 70. Authentication and authorization of traffic from PMUs 26 can be handled by another centralized system, which passes the group key to PMU data consumers 70 (i.e., end receivers), if they are authorized to view traffic from PMU 26.

In another example, IP source guard (IPSG) may be enabled on an untrusted interface. IPSG is a security feature that can restrict IP traffic on non-routed, Layer 2 interfaces by filtering traffic based on the DHCP snooping binding database and/or on statically configured IP source bindings. After IPSG is enabled on an interface, a switch can block the IP traffic received on the interface, except for DHCP packets allowed by DHCP snooping. A port ACL can be applied to the interface to allow only IP traffic with a source IP address in the IP source binding table (and deny other traffic). The port ACL can have precedence over router ACLs or VLAN maps that affect the same interface.

The IP source binding table bindings can be learned by DHCP snooping, or can be manually configured (static IP source bindings). An entry in this table has an IP address with its associated media access control (MAC) address and VLAN number. The switch uses the IP source binding table only when IP source guard is enabled. IPSG for static hosts extends the IPSG capability to non-DHCP and static environments. The previous example of IPSG used the entries created by DHCP snooping to validate the hosts connected to a switch. Any traffic received from a host without a valid DHCP binding entry is dropped. This security feature restricts IP traffic on non-routed Layer 2 interfaces, as the system filters traffic based on the DHCP snooping binding database and on manually configured IP source bindings. The previous example of IPSG required a DHCP environment for IPSG to work.

IPSG for static hosts allows IPSG to work without DHCP. IPSG for static hosts can rely on IP device tracking table entries to install port ACLs. The switch can create static entries based on ARP requests, or other IP packets, to maintain a list of valid hosts for a given port. The number of hosts allowed to send traffic to a given port can also be specified. This can be thought of as the equivalent to port security at Layer 3.

IPSG for static host can also support dynamic hosts such that if a dynamic host receives a DHCP-assigned IP address, which is available in the IP DHCP snooping table, the same entry is learned by the IP device tracking table. In a stacked environment, when a master failover occurs, the IP source guard entries for static hosts attached to member ports can be retained. IPSG for static hosts initially learns IP or MAC bindings dynamically through an ACL-based snooping mechanism. IP or MAC bindings can be learned from static hosts by ARP and IP packets.

The IP or MAC bindings are stored in a device-tracking database. When the number of IP addresses that have been dynamically learned or statically configured on a given port reaches a maximum, the hardware can drop any packet with a new IP address. To resolve hosts that have moved (or gone away), IPSG for static hosts can leverage IP device tracking to age out dynamically learned IP address bindings. This feature can be used with DHCP snooping. Multiple bindings can be established on a port that is connected to both DHCP and static hosts. For example, bindings can be stored in both the device-tracking database, as well as in the DHCP snooping binding database.

In another implementation, IP traffic is filtered based on the source IP and MAC addresses. The switch forwards traffic only when the source IP and MAC addresses match an entry in the IP source-binding table. When address filtering is enabled, a switch can filter IP and non-IP traffic. If the source MAC address of an IP or non-IP packet matches a valid IP source binding, the switch forwards the packet. The switch can drop other types of packets, except DHCP packets. The switch can use port security to filter source MAC addresses. The interface can shut down when a port-security violation occurs.

Secure MAC addresses can allow a maximum number of secure addresses on a port, which is configured using a switch port port-security maximum value interface configuration command. The switch may support static secure MAC addresses that are manually configured by using a switch port port-security MAC address or MAC address interface configuration command. The static secure MAC addresses are stored in the address table and added to the switch (e.g., during configuration activities). In addition, the dynamic secure MAC addresses may be configured, stored only in the address table, and removed when the switch restarts. Further, sticky secure MAC addresses can be dynamically learned or manually configured, stored in the address table, and added to the running configuration. If sticky secure MAC addresses are saved in the configuration file, when the switch restarts, the interface does not need to dynamically reconfigure them.

An interface may be configured to convert the dynamic MAC addresses to sticky secure MAC addresses, and to add them to the running configuration by enabling sticky learning. To enable sticky learning, a switch port port-security MAC address sticky interface configuration command may be entered into the interface. When the command is entered, the interface converts the dynamic secure MAC addresses, including those that were dynamically learned before sticky learning was enabled, to sticky secure MAC addresses. Then the sticky secure MAC addresses are added to the running configuration.

In certain implementations, the sticky secure MAC addresses do not automatically become part of the configuration file, which is the startup configuration used each time the switch restarts. If sticky secure MAC addresses are saved in the configuration file, when the switch restarts, the interface does not need to relearn these addresses. The maximum number of secure MAC addresses that can be configured on a switch stack can be set by the maximum number of available MAC addresses allowed in the system.

A security violation may occur if the maximum number of secure MAC addresses have been added to the address table, and a station whose MAC address is not in the address table attempts to access the interface. A security violation may also occur if an address learned or configured on one secure interface is seen on another secure interface in the same VLAN. When a security violation does occur, remedial actions may be taken. For example, when the number of secure MAC addresses reaches the maximum limit allowed on the port, packets with unknown source addresses are dropped until a sufficient number of secure MAC addresses are removed to drop below the maximum value. In another example, the number of maximum allowable MAC addresses is increased. As a result, a simple network management protocol (SNMP) trap can be sent, a syslog message is logged, and the violation counter would increment. Alternatively, the number of maximum allowable addresses may be increased.

In another implementation, a port security violation causes the interface to become error-disabled, to shut down, and the port LED can turn off. An SNMP trap may then be sent, a syslog message logged, and the violation counter is incremented. When a secure port is in the error-disabled state, it can be brought out of this state by entering the error disabled (e.g., 'errdisable') recovery cause secure violation command (e.g., 'psecure-violation' global configuration command in the default mode). In an embodiment of the present disclosure, a virtual LAN (VLAN) can be error disabled instead of the entire port when a violation occurs.

In another embodiment, packet filtering can help to limit network traffic and restrict network use by certain users or certain devices. ACLs can filter traffic as it passes through a router (e.g., a first-hop router) or a switch and, further, permit or deny packets crossing on physical interfaces or VLANs. An ACL is a sequential collection of permit and deny conditions that can apply to packets. When a packet is received on an interface, the switch is configured to compare the fields in the packet against any applied ACLs to verify that the packet has the required permissions to be forwarded based on the criteria specified in the access lists.

The switch is configured to test packets (e.g., individually) against the conditions in an access list. The first match decides whether the switch accepts or rejects the packets. Because the switch stops testing after the first match, the order of conditions in the list can be critical. If no conditions match, the switch can reject the packet. If there are no restrictions, the switch can forward the packet; otherwise, the switch can drop the packet. The switch can use ACLs on packets it forwards including packets bridged within a VLAN.

Access lists can also be configured on a router or Layer 3 switch to provide basic security for the network. If no ACLs are configured, packets passing through the switch could be allowed onto various parts of the network. ACLs can be used to control which hosts can access different parts of a network, or to decide which types of traffic are forwarded or blocked at router interfaces. ACLs can also be configured to block inbound traffic, outbound traffic, or both. An ACL may include an ordered list of access control entries (ACEs). Each ACE specifies "permit" or "deny" and a set of conditions the packet should satisfy in order to match the ACE. The meaning of permit or deny depends on the context in which the ACL is used. The switch can support IP ACLs and Ethernet (MAC) ACLs: IP ACLs filter IPv4/IPv6 traffic, including TCP, User Datagram Protocol (UDP), Internet Group Management Protocol (IGMP), and Internet Control Message Protocol (ICMP), etc. The switch may also support QoS classification ACLs.

In one implementation, after a MAC ACL is created, the MAC ACL can be applied to a Layer 2 interface to filter non-IP traffic propagating to that interface. If the ACL is applied to a Layer 2 interface that is a member of a VLAN, the Layer 2 (port) ACL can have precedence over an input Layer 3 ACL (applied to the VLAN interface, or a VLAN map applied to the VLAN). Incoming packets received on the Layer 2 port can be filtered by the port ACL. A single IP access list and MAC access list should be applied to the same Layer 2 interface. The IP access list can filter IP packets, and the MAC access list filters non-IP packets. A Layer 2 interface can have one MAC access list. If a MAC access list is applied to a Layer 2 interface that has a MAC ACL configured, the new ACL replaces the previously configured one.

Note that in certain example implementations, the grid management and/or communication functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIGS. 2A, 2B, and 3A] can store data used for the operations described herein. This includes the memory element being able to store non-transitory code (e.g., software, logic, processor instructions, etc.) that is executed to carry out the activities described in this Specification. A processor can execute any type of instructions associated with the data to achieve the operations detailed herein in this Specification. In one example, the processor [as shown in FIGS. 2A, 2B, and 3A] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In regards to the infrastructure of grid system 10, in one example implementation, PMU 26, PDC 28, FHR 32, LHR 64, PMU data consumer 70, and/or service module 92 are simply reflective of a network element configured for conducting the energy management activities discussed herein. As used herein in this Specification, the term 'network element' is meant to encompass first-hop routers/last-hop routers, service devices, servers, consoles, network appliances, proprietary devices, switches, gateways, bridges, loadbalancers, firewalls, sensors (of any kind), inline service nodes, proxies, processors, modules, or any other suitable device, component, element, or object operable to exchange information in a network environment. This network element may include any suitable hardware, software, components, modules, interfaces, or objects that facilitate the operations thereof. This may be inclusive of appropriate algorithms and communication protocols that allow for the effective exchange (reception and/or transmission) of data or information.

Additionally, PMU 26, PDC 28, FHR 32, LHR 64, PMU data consumer 70, and/or service module 92 may include software (e.g., unicast to multicast module 86) in order to achieve the grid management and/or communication functions outlined herein. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, tables, trees, cache, etc.) should be construed as being encompassed within the broad term 'memory element.' Similarly, any of the potential processing elements, modules, and machines described in this Specification should be construed as being encompassed within the broad term 'processor.' Each of these elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that grid system 10 (and its teachings) are readily scalable and can accommodate a large number of components, as well as more complicated/sophisticated arrangements and configurations. Accordingly, the examples provided should not limit the scope or inhibit the broad teachings of grid system 10 as potentially applied to a myriad of other architectures.

It is also important to note that the steps in the preceding flow diagrams illustrate only some of the possible scenarios and patterns that may be executed by, or within, grid system 10. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion. Substantial flexibility is provided by grid system 10 in that any suitable arrangements, chronologies, configurations, and timing mechanisms may be provided without departing from the teachings of the present disclosure.

In addition, although the PMU data management activities discussed herein have been described as being applied at the transmission level, such activities could readily be implemented at the distribution level without departing from the broad scope of the present disclosure. Moreover, any type of sensor (not only PMUs/PDCs, etc.) could be accommodated in the context of the data management activities discussed herein.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   determining a plurality of services to be performed on phasor measurement unit (PMU) data;
   identifying a plurality of service devices, wherein each of the plurality of service devices is to perform one or more of the plurality of services on the PMU data; and
   directing the PMU data across the plurality of service devices to perform the plurality of services on the PMU data, wherein the directing further comprises:
   receiving at least one packet of the PMU data appended with a service insertion architecture (SIA) context;
   identifying a service classification for the at least one packet of the PMU data via the SIA context;
   determining a service policy for the at least one packet of the PMU data based, at least in part, on the service classification; and
   applying the service policy to the at least one packet of the PMU data.

2. The method of claim 1, further comprising:
   classifying the PMU data to determine a service classification for the PMU data.

3. The method of claim 2, further comprising:
   appending one or more packets of the PMU data with the service classification.

4. The method of claim 3, wherein the appending further comprises including the service classification within the SIA context associated with the one or more packets of the PMU data.

5. The method of claim 1, further comprising:
   determining a service device to receive the at least one packet of the PMU data based, at least in part, on the SIA context; and
   communicating the at least one packet of the PMU data to the service device.

6. The method of claim 1, further comprising:
   removing the SIA context from the at least one packet of the PMU data if a last service is performed on the at least one packet of the PMU data.

7. Logic encoded in one or more non-transitory media that includes code for execution by a processor, wherein the execution causes the processor to perform operations comprising:
   determining a plurality of services to be performed on phasor measurement unit (PMU) data;
   identifying a plurality of service devices, wherein each of the plurality of service devices is to perform one or more of the plurality of services on the PMU data; and
   directing the PMU data across the plurality of service devices to perform the plurality of services on the PMU data, wherein the directing further comprises:
   receiving at least one packet of the PMU data appended with a service insertion architecture (SIA) context;
   identifying a service classification for the at least one packet of the PMU data via the SIA context;
   determining a service policy for the at least one packet of the PMU data based, at least in part, on the service classification; and
   applying the service policy to the at least one packet of the PMU data.

8. The logic of claim 7, wherein the execution causes the processor to perform further operations comprising:
   classifying the PMU data to determine a service classification for the PMU data.

9. The logic of claim 8, wherein the execution causes the processor to perform further operations comprising:
   appending one or more packets of the PMU data with the service classification.

10. The logic of claim 9, wherein the appending further comprises including the service classification within the SIA context associated with the one or more packets of the PMU data.

11. The logic of claim 7, wherein the execution causes the processor to perform further operations comprising:
    determining a service device to receive the at least one packet of the PMU data based, at least in part, on the SIA context; and
    communicating the at least one packet of the PMU data to the service device.

12. The logic of claim 7, wherein the execution causes the processor to perform further operations comprising:
    removing the SIA context from the at least one packet of the PMU data if a last service is performed on the at least one packet of the PMU data.

13. An apparatus, comprising:
    a memory element configured to store data;
    a processor operable to execute instructions associated with the data, wherein executing the instructions causes the apparatus to perform operations comprising:
    determining a plurality of services to be performed on phasor measurement unit (PMU) data;

identifying a plurality of service devices, wherein each of the plurality of service devices is to perform one or more of the plurality of services on the PMU data; and directing the PMU data across the plurality of service devices to perform the plurality of services on the PMU data, wherein the directing further comprises:

receiving at least one packet of the PMU data appended with a service insertion architecture (SIA) context;

identifying a service classification for the at least one packet of the PMU data via the SIA context;

determining a service policy for the at least one packet of the PMU data based, at least in part, on the service classification; and applying the service policy to the at least one packet of the PMU data.

14. The apparatus of claim 13, wherein executing the instructions causes the apparatus to perform further operations comprising:

classifying the PMU data to determine a service classification for the PMU data.

15. The apparatus of claim 14, wherein the apparatus is further configured for:

appending one or more packets of the PMU data with the service classification.

16. The apparatus of claim 15, wherein the appending further comprises including the service classification within an SIA context associated with the one or more packets of the PMU data.

17. The apparatus of claim 13, wherein executing the instructions causes the apparatus to perform further operations comprising:

determining a service device to receive the at least one packet of the PMU data based, at least in part, on the SIA context; and communicating the at least one packet of the PMU data to the service device.

* * * * *